United States Patent
Ko et al.

(10) Patent No.: US 11,943,770 B2
(45) Date of Patent: Mar. 26, 2024

(54) METHOD AND APPARATUS FOR PERFORMING WIRELESS COMMUNICATION BASED ON SL RESOURCE IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 17/812,820

(22) Filed: Jul. 15, 2022

(65) Prior Publication Data

US 2023/0038045 A1 Feb. 9, 2023

Related U.S. Application Data

(60) Provisional application No. 63/292,995, filed on Dec. 22, 2021.

(30) Foreign Application Priority Data

Jul. 16, 2021 (KR) .................. 10-2021-0093680
Jul. 23, 2021 (KR) .................. 10-2021-0096890

(51) Int. Cl.
*H04W 72/20* (2023.01)
*H04W 76/28* (2018.01)

(52) U.S. Cl.
CPC .......... *H04W 72/20* (2023.01); *H04W 76/28* (2018.02)

(58) Field of Classification Search
None
See application file for complete search history.

(56) References Cited

U.S. PATENT DOCUMENTS

| | | | |
|---|---|---|---|
| 2023/0082194 A1* | 3/2023 | Liu | H04W 72/40 370/310 |
| 2023/0209648 A1* | 6/2023 | Park | H04W 4/40 370/329 |
| 2023/0363044 A1* | 11/2023 | Chae | H04W 76/28 |

FOREIGN PATENT DOCUMENTS

| | | |
|---|---|---|
| KR | 10-2021-0157406 | 12/2021 |
| KR | 10-2021-0158388 | 12/2021 |

OTHER PUBLICATIONS

Korean Intellectual Property Office Application No. 10-2022-0087748, Notice of Allowance dated Dec. 27, 2022, 3 pages.

(Continued)

*Primary Examiner* — Nguyen H Ngo
(74) *Attorney, Agent, or Firm* — LEE, HONG, DEGERMAN, KANG & WAIMEY

(57) ABSTRACT

Proposed herein are a method for performing wireless communication by a first apparatus and an apparatus supporting the same. The method may include the steps of obtaining SL DRX configuration including information related to SL DRX active time of a second apparatus, determining a selection window, selecting at least one first candidate resource within the selection window based on sensing, selecting at least one second candidate resource within the SL DRX active time of the second apparatus, based on the at least one first candidate resource not being within the SL DRX active time of the second apparatus, selecting an SL resource from among the at least one first candidate resource and the at least one second candidate resource, transmitting first SCI, to the second apparatus, for scheduling a PSSCH and second SCI, through a PSCCH, based on the SL resource, and transmitting the second SCI and a MAC PDU to the second apparatus, through the PSSCH, based on the SL resource.

14 Claims, 21 Drawing Sheets

(56) References Cited

OTHER PUBLICATIONS

Huawei et al., "Sidelink resource allocation to reduce power consumption," 3GPP TSG RAN WG1 Meeting #105-e, e-Meeting, R1-2104236, May 2021, 25 pages.

LG Electronics, "Discussion on resource allocation for power saving," 3GPP TSG RAN WG1 Meeting #104bis-e, e-Meeting, R1-2103378, Apr. 2021, 21 pages.

Fujitsu, "Considerations on Partial Sensing and DRX in NR V2X," 3GPP TSG RAN WG1 Meeting #104-e, e-Meeting, R1-2101788, Updated for R1-2100745, Jan. 2021, 23 pages.

Ericsson, "Resource allocation procedures for power saving," 3GPP TSG RAN WG1 #104b-e, e-Meeting, R1-2103704, Apr. 2021, 16 pages.

Ericsson, "Interaction between partial sensing and DRX," 3GPP TSG-RAN WG2 #114e, Electronic meeting, R2-2105494, Revision of R2-2103005, May 2021, 5 pages.

ZTE Corporation et al., "Discussion on sensing and DRX," 3GPP TSG-RAN WG2 Meeting #113-e, Online, R2-2100499, Jan. 2021, 3 pages.

ZTE Corporation et al., "Discussion on principle for Sidelink DRX," 3GPP TSG-RAN WG2 Meeting #113 electronic, Online, R2-2100496, Feb. 2021, 5 pages.

Korean Intellectual Property Office Application No. 10-2022-0087748, Office Action dated Aug. 22, 2022, 7 pages.

Fujitsu, "Considerations on Partial Sensing and DRX in NR V2X," R1-2100745, 3GPP TSG RAN WG1 Meeting #104-e, Feb. 2021, 23 pages.

Moderator (OPPO), "FL summary for AI 8.11.1.1—resource allocation for power saving (3rd check point)," R1-2104092, 3GPP TSG RAN WG1 #104b-e, Apr. 2021, 120 pages.

Samsung, "On resource allocation for power saving," R1-2105334, 3GPP TSG RAN WG1 Meeting #105-e, May 2021, 15 pages.

Korean Intellectual Property Office Application No. 10-2023-0012151, Notice of Allowance dated May 23, 2023, 7 pages.

* cited by examiner (a)      (b)      (c)

● : TX UE
◎ : RX UE

METHOD AND APPARATUS FOR PERFORMING WIRELESS COMMUNICATION BASED ON SL RESOURCE IN NR V2X

CROSS-REFERENCE TO RELATED APPLICATIONS

Pursuant to 35 U.S.C. § 119, this application claims the benefit of earlier filing date and right of priority to Korean Application Nos. 10-2021-0093680, filed on Jul. 16, 2021, and 10-2021-0096890, filed on Jul. 23, 2021, and also claims the benefit of U.S. Provisional Application No. 63/292,995, filed on Dec. 22, 2021, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

For example, partial sensing may be operated in combination with SL discontinuous reception (DRX). For example, when a transmission (TX) UE performing partial sensing during SL DRX operation performs periodic transmission, and when the TX UE selects a candidate resource, and, by applying an RSRP threshold, the TX UE may not be capable of efficiently selecting a resource.

For example, the candidate resource/slot may be selected within the selection window and within a region excluding the SL DRX active time (e.g., an SL DRX inactive time within an SL DRX cycle) based on the sensing. For example, the TX UE may perform SL communication with a reception (RX) UE based on the SL resource/slot that is finally selected from among candidate resources/slots that are selected from the region excluding the SL DRX active time.

Technical Solutions

According to an embodiment of the present disclosure, provided herein is a method for performing, by a first apparatus, wireless communication. The first apparatus may obtain sidelink (SL) discontinuous reception (DRX) configuration including information related to SL DRX active time of a second apparatus. For example, the first apparatus may determine a selection window. For example, the first apparatus may select at least one first candidate resource within the selection window based on sensing. For example, the first apparatus may select at least one second candidate resource within the SL DRX active time of the second apparatus, based on the at least one first candidate resource not being within the SL DRX active time of the second apparatus. For example, the first apparatus may select an SL resource from among the at least one first candidate resource and the at least one second candidate resource. For example, the first apparatus may transmit first SCI, to the second apparatus, for scheduling a physical sidelink shared channel (PSSCH) and second sidelink control information (SCI), through a physical sidelink control channel (PSCCH), based on the SL resource. For example, the first apparatus may transmit the second SCI and a medium access control (MAC) packet data unit (PDU) to the second apparatus, through the PSSCH, based on the SL resource.

According to an embodiment of the present disclosure, provided herein is a first apparatus for performing wireless communication. The first apparatus may include one or more memories storing instructions, one or more transceivers, and one or more processors connected to the one or more memories and the one or more transceivers, wherein the one or more processors may execute the instructions to obtain sidelink (SL) discontinuous reception (DRX) configuration including information related to SL DRX active time of a second apparatus. For example, the one or more processors may execute the instructions to determine a selection window. For example, the one or more processors may execute the instructions to select at least one first candidate resource within the selection window based on sensing. For example, the one or more processors may execute the instructions to select at least one second candidate resource within the SL DRX active time of the second apparatus, based on the at least one first candidate resource not being within the SL DRX active time of the second apparatus. For example, the one or more processors may execute the instructions to select an SL resource from among the at least one first candidate resource and the at least one second candidate resource. For example, the one or more processors may execute the instructions to transmit first SCI, to the second apparatus, for scheduling a physical sidelink shared channel (PSSCH) and second sidelink control information (SCI), through a physical sidelink control channel (PSCCH), based on the SL resource. For example, the one or more processors may execute the instructions to transmit the second SCI and a medium access control (MAC) packet data unit (PDU) to the second apparatus, through the PSSCH, based on the SL resource.

According to an embodiment of the present disclosure, provided herein is an apparatus configured to control a first user equipment (UE). The apparatus may include one or more processors, and one or more memories operably connectable to the one or more processors and storing instructions, wherein the one or more processors may execute the instructions to obtain sidelink (SL) discontinuous reception (DRX) configuration including information related to SL DRX active time of a second UE. For example, the one or more processors may execute the instructions to determine a selection window. For example, the one or more processors may execute the instructions to select at least one first candidate resource within the selection window based on sensing. For example, the one or more processors may execute the instructions to select at least one second candidate resource within the SL DRX active time of the second UE, based on the at least one first candidate resource not being within the SL DRX active time of the second UE. For example, the one or more processors may execute the instructions to select an SL resource from among the at least one first candidate resource and the at least one second candidate resource. For example, the one or more processors may execute the instructions to transmit first SCI, to the second UE, for scheduling a physical sidelink shared channel (PSSCH) and second sidelink control information (SCI), through a physical sidelink control channel (PSCCH), based on the SL resource. For example, the one or more processors may execute the instructions to transmit the second SCI and a medium access control (MAC) packet data unit (PDU) to the second UE, through the PSSCH, based on the SL resource.

According to an embodiment of the present disclosure, provided herein is a non-transitory computer-readable medium having instructions recorded thereon. When enacted by one or more processors, the instructions may cause the one or more processors to obtain, by a first apparatus, sidelink (SL) discontinuous reception (DRX) configuration including information related to SL DRX active time of a second apparatus. For example, when enacted by one or more processors, the instructions may cause the one or more processors to determine, by the first apparatus, a selection window. For example, when enacted by one or more processors, the instructions may cause the one or more processors to select, by the first apparatus, at least one first candidate resource within the selection window based on sensing. For example, when enacted by one or more processors, the instructions may cause the one or more processors to select, by the first apparatus, at least one second candidate resource within the SL DRX active time of the second apparatus, based on the at least one first candidate resource not being within the SL DRX active time of the second apparatus. For example, when enacted by one or more processors, the instructions may cause the one or more processors to select, by the first apparatus, an SL resource from among the at least one first candidate resource and the at least one second candidate resource. For example, when enacted by one or more processors, the instructions may cause the one or more processors to transmit, by the first apparatus, first SCI, to the second apparatus, for scheduling a physical sidelink shared channel (PSSCH) and second sidelink control information (SCI), through a physical sidelink control channel (PSCCH), based on the SL resource. For example, when enacted by one or more processors, the instructions may cause the one or more processors to transmit, by the first apparatus, the second SCI and a medium access control (MAC) packet data unit (PDU) to the second apparatus, through the PSSCH, based on the SL resource.

According to an embodiment of the present disclosure, provided herein is a method for performing, by a second apparatus, wireless communication. The second apparatus may obtain sidelink (SL) discontinuous reception (DRX) configuration including information related to SL DRX active time of the second apparatus. For example, the second apparatus may receive first SCI, from a first apparatus, for scheduling a physical sidelink shared channel (PSSCH) and second sidelink control information (SCI), through a physical sidelink control channel (PSCCH), based on the SL resource. For example, the second apparatus may receive the second SCI and a medium access control (MAC) packet data unit (PDU) from the first apparatus, through the PSSCH, based on the SL resource. For example, the SL resource may be a resource that is selected from among at least one second candidate resource being selected within the SL DRX active time of the second apparatus, based on at least one first candidate resource being selected from a selection window and not being within the SL DRX active time of the second apparatus.

According to an embodiment of the present disclosure, provided herein is a second apparatus for performing wireless communication. The second apparatus may include one or more memories storing instructions, one or more transceivers, and one or more processors connected to the one or more memories and the one or more transceivers, wherein the one or more processors may execute the instructions to obtain sidelink (SL) discontinuous reception (DRX) configuration including information related to SL DRX active time of the second apparatus. For example, the one or more processors may execute the instructions to receive first SCI, from a first apparatus, for scheduling a physical sidelink shared channel (PSSCH) and second sidelink control information (SCI), through a physical sidelink control channel (PSCCH), based on the SL resource. For example, the one or more processors may execute the instructions to receive the second SCI and a medium access control (MAC) packet data unit (PDU) from the first apparatus, through the PSSCH, based on the SL resource. For example, the SL resource may be a resource that is selected from among at least one second candidate resource being selected within the SL DRX active time of the second apparatus, based on at least one first candidate resource being selected from a selection window and not being within the SL DRX active time of the second apparatus.

According to an embodiment of the present disclosure, provided herein is an apparatus configured to control a second user equipment (UE). The apparatus may include one or more processors, and one or more memories operably connectable to the one or more processors and storing instructions, wherein the one or more processors may execute the instructions to obtain sidelink (SL) discontinuous reception (DRX) configuration including information related to SL DRX active time of the second UE. For example, the one or more processors may execute the instructions to receive first SCI, from a first UE, for scheduling a physical sidelink shared channel (PSSCH) and second sidelink control information (SCI), through a physical sidelink control channel (PSCCH), based on the SL resource. For example, the one or more processors may execute the instructions to receive the second SCI and a medium access control (MAC) packet data unit (PDU) from the first UE, through the PSSCH, based on the SL resource. For example, the SL resource may be a resource that is selected from among at least one second candidate resource being selected within the SL DRX active time of the second UE, based on at least one first candidate resource being selected from a selection window and not being within the SL DRX active time of the second UE.

According to an embodiment of the present disclosure, provided herein is a non-transitory computer-readable medium having instructions recorded thereon. When enacted by one or more processors, the instructions may cause the one or more processors to obtain, by a second apparatus, sidelink (SL) discontinuous reception (DRX) configuration including information related to SL DRX active time of the second apparatus. For example, when enacted by one or more processors, the instructions may cause the one or more processors to receive, by the second apparatus, first SCI, from a first apparatus, for scheduling a physical sidelink shared channel (PSSCH) and second sidelink control information (SCI), through a physical sidelink control channel (PSCCH), based on the SL resource. For example, when enacted by one or more processors, the instructions may cause the one or more processors to receive, by the second apparatus, the second SCI and a medium access control (MAC) packet data unit (PDU) from the first apparatus, through the PSSCH, based on the SL resource. For example, the SL resource may be a resource that is selected from among at least one second candidate resource being selected within the SL DRX active time of the second apparatus, based on at least one first candidate resource being selected from a selection window and not being within the SL DRX active time of the second apparatus.

Effects of the Disclosure

A user equipment (UE) may efficiently perform sidelink (SL) communication.

DESCRIPTION OF EXEMPLARY EMBODIMENTS

Figure 1:
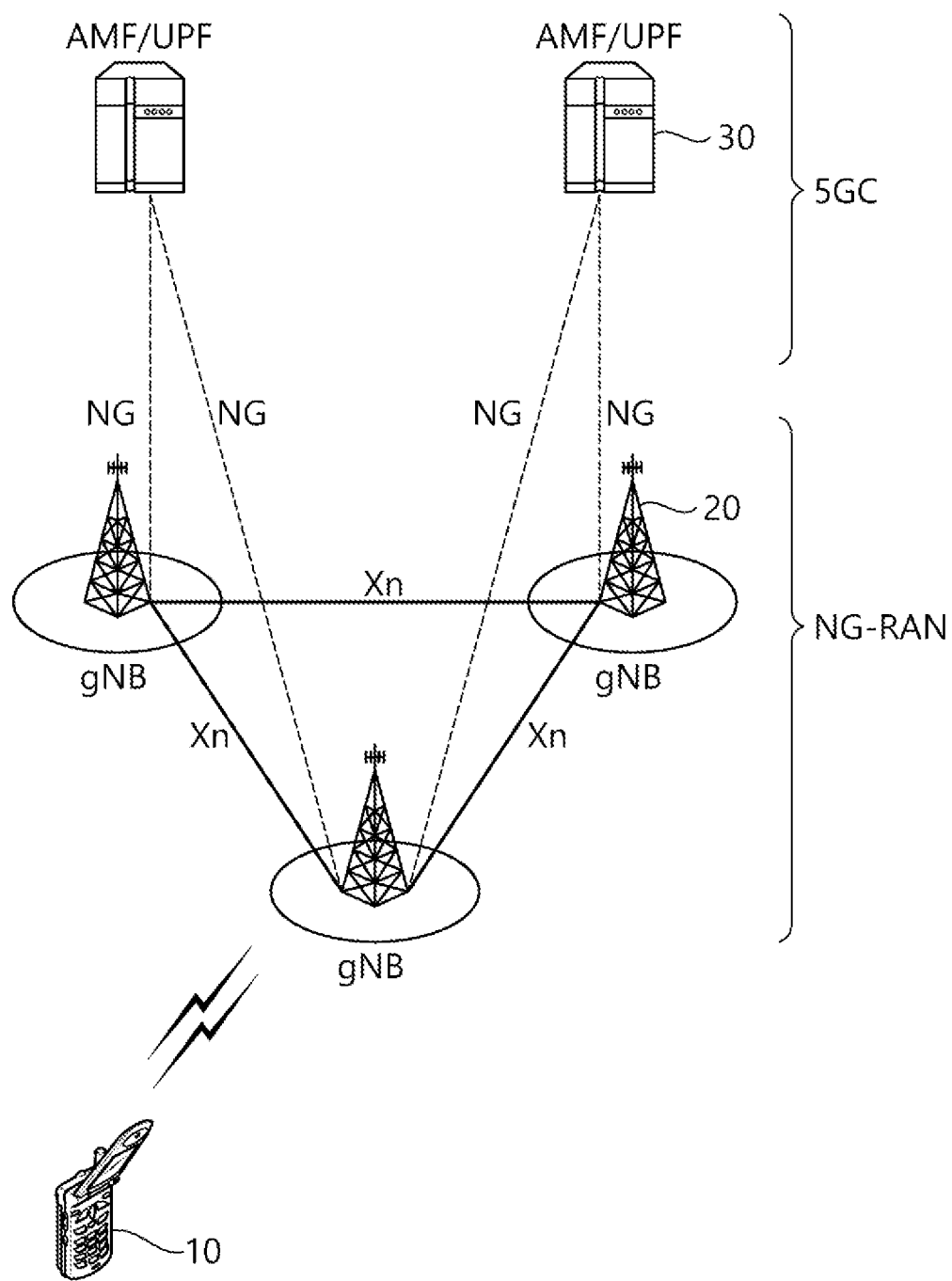
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
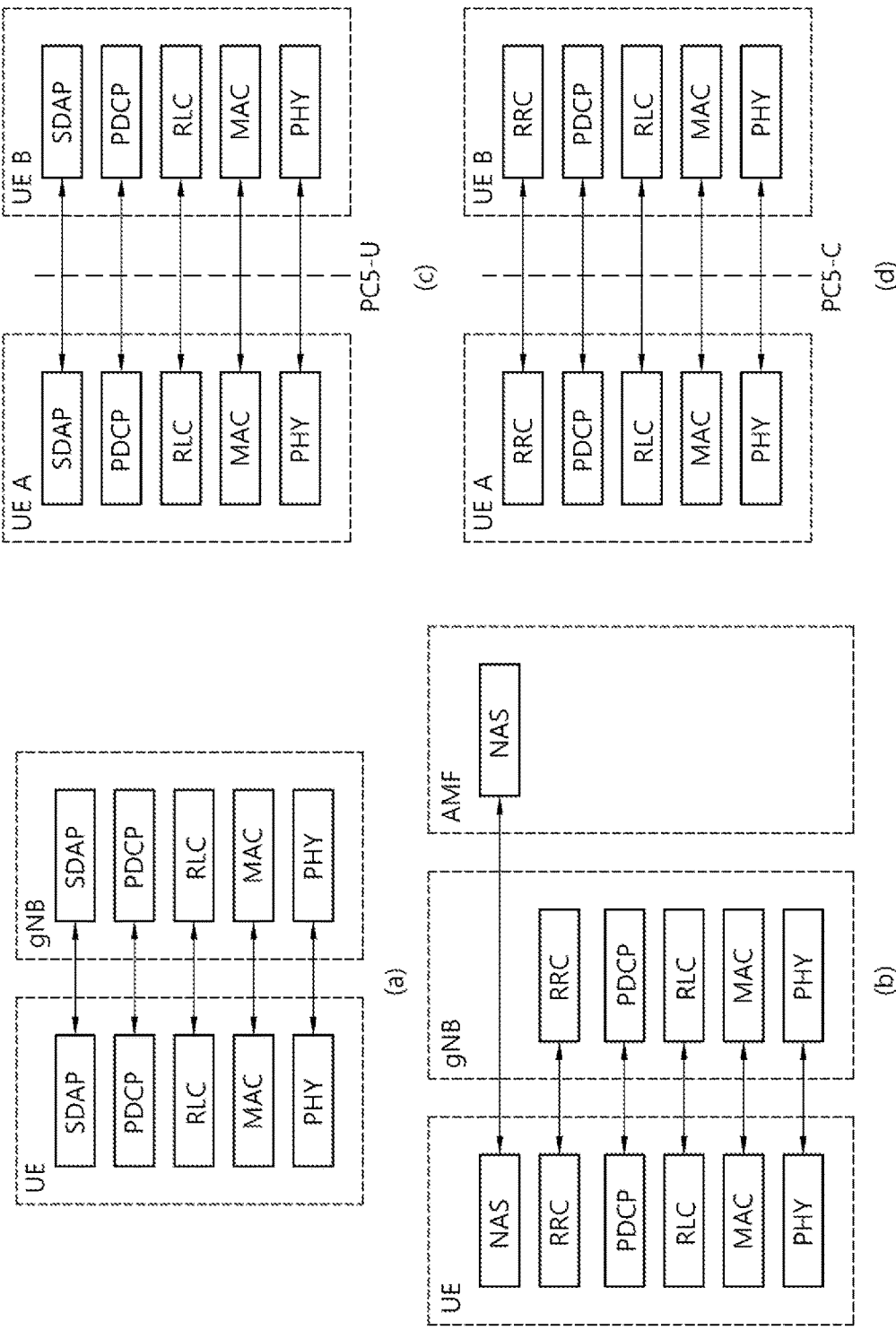
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC INACTIVE state is additionally defined, and a UE being in the RRC INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
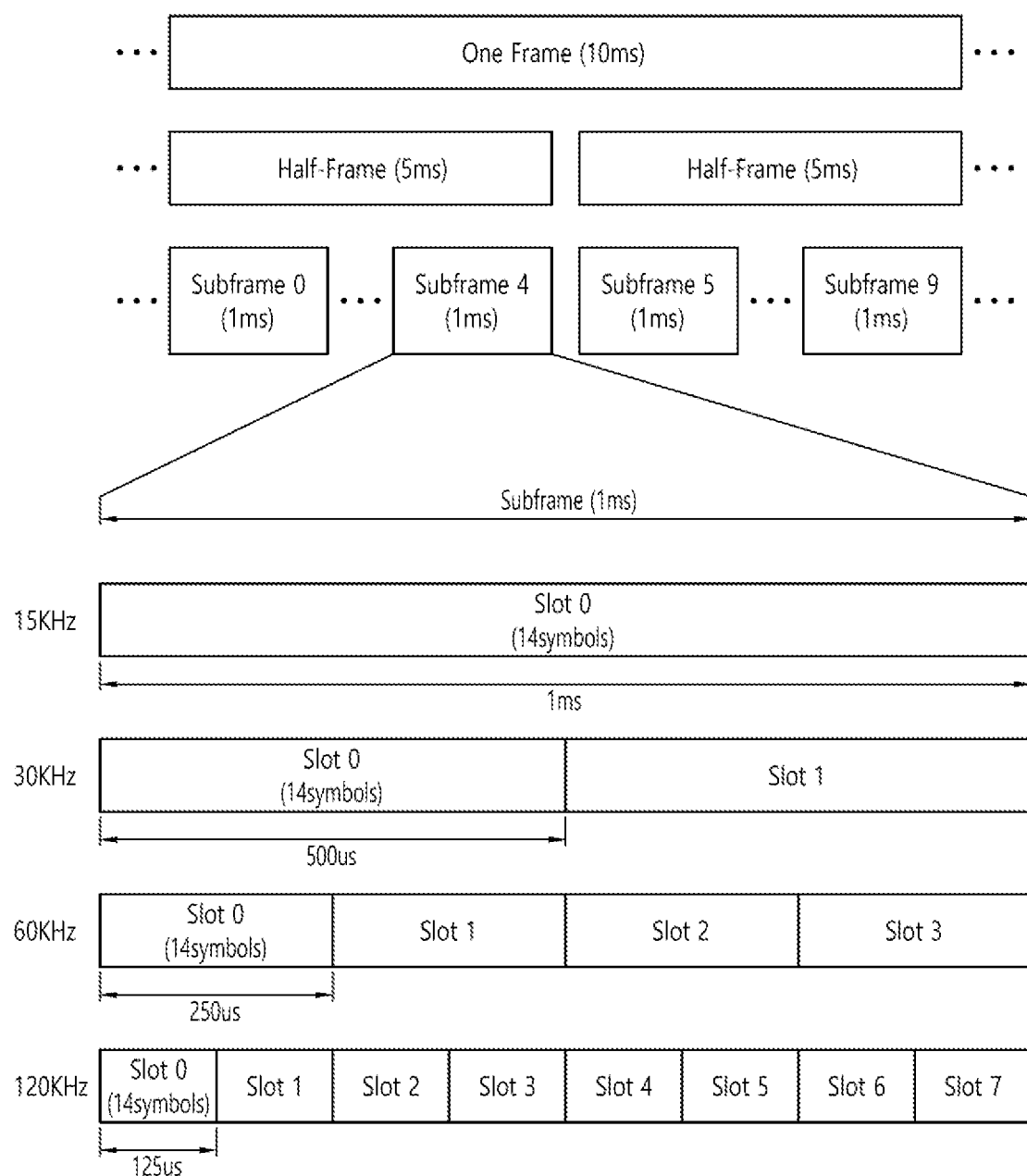
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 4:
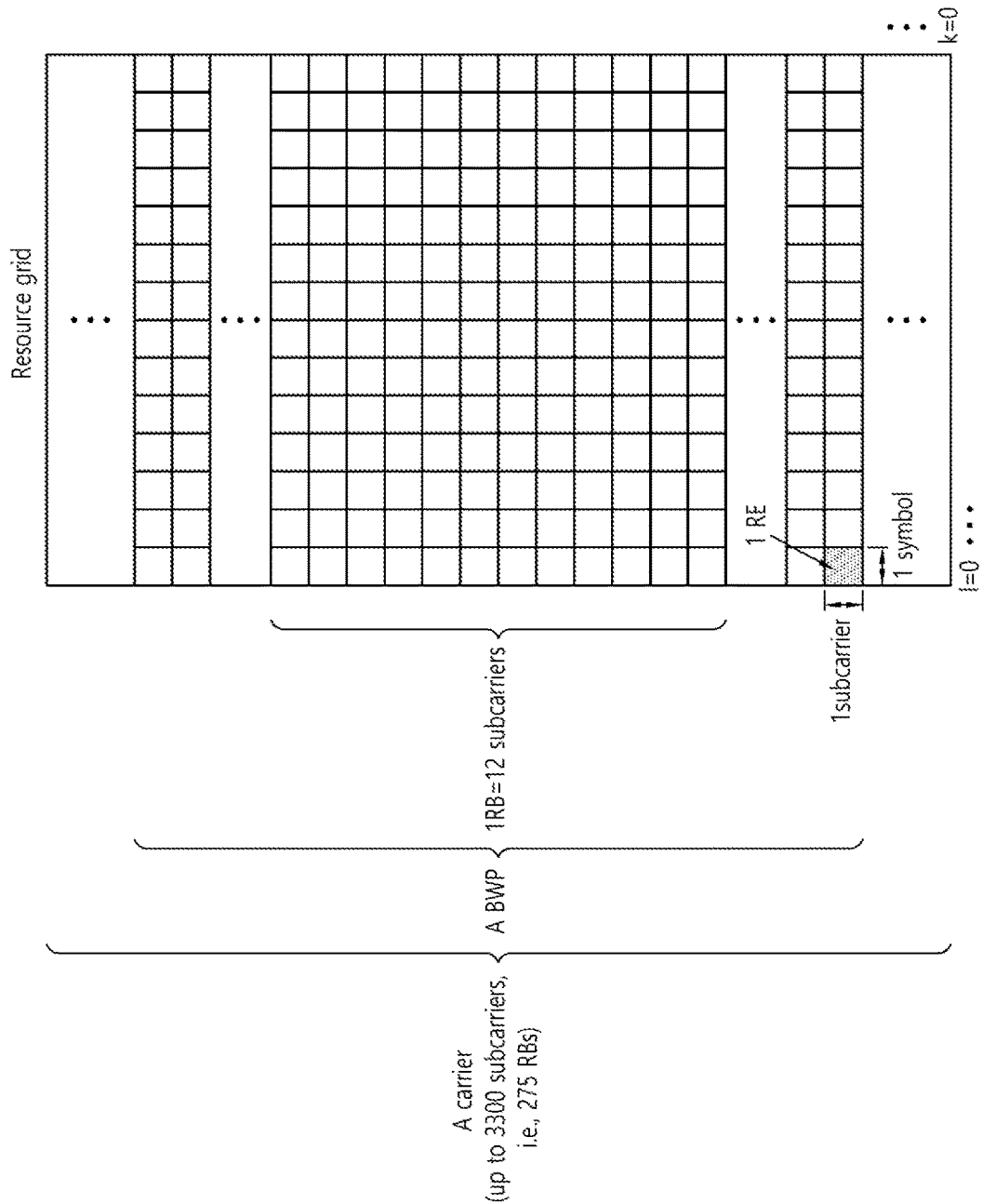
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP.

In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
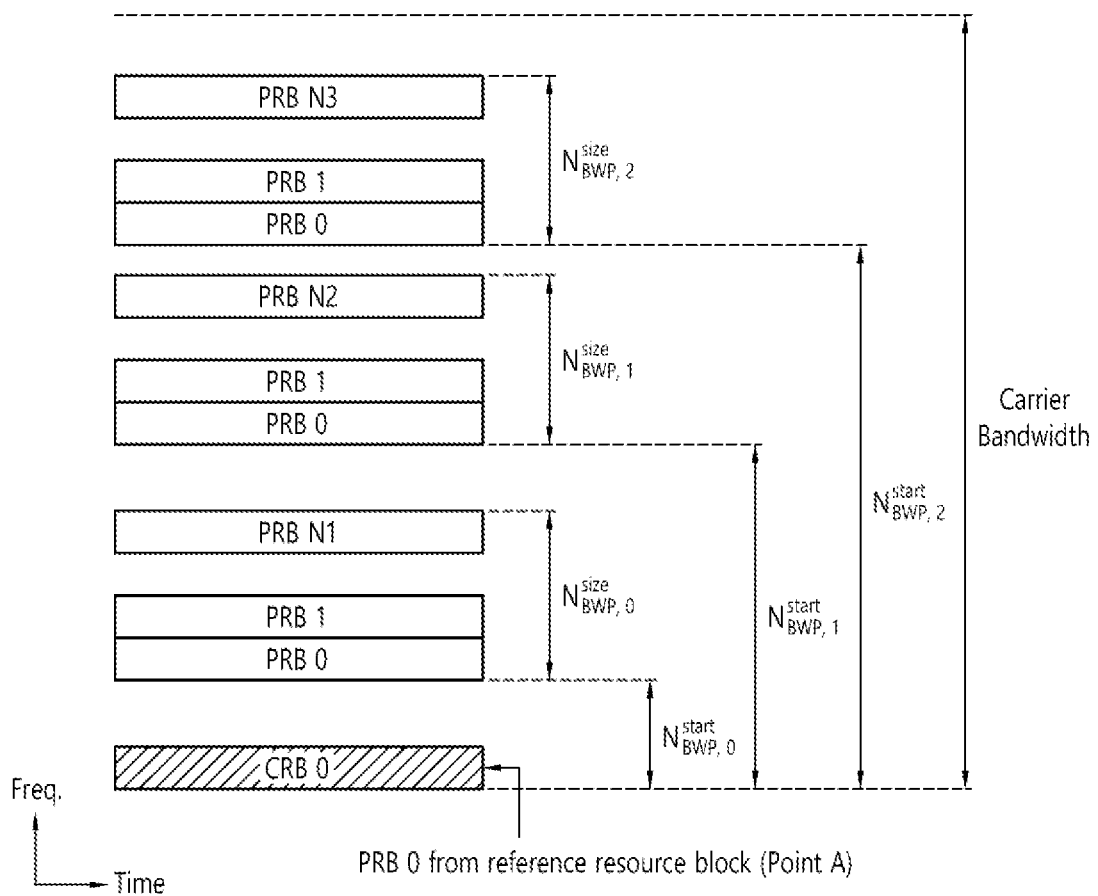
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}BWP$ from the point A, and a bandwidth $N^{size}Bwp$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127-M-sequences may be used for the S-PS S, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
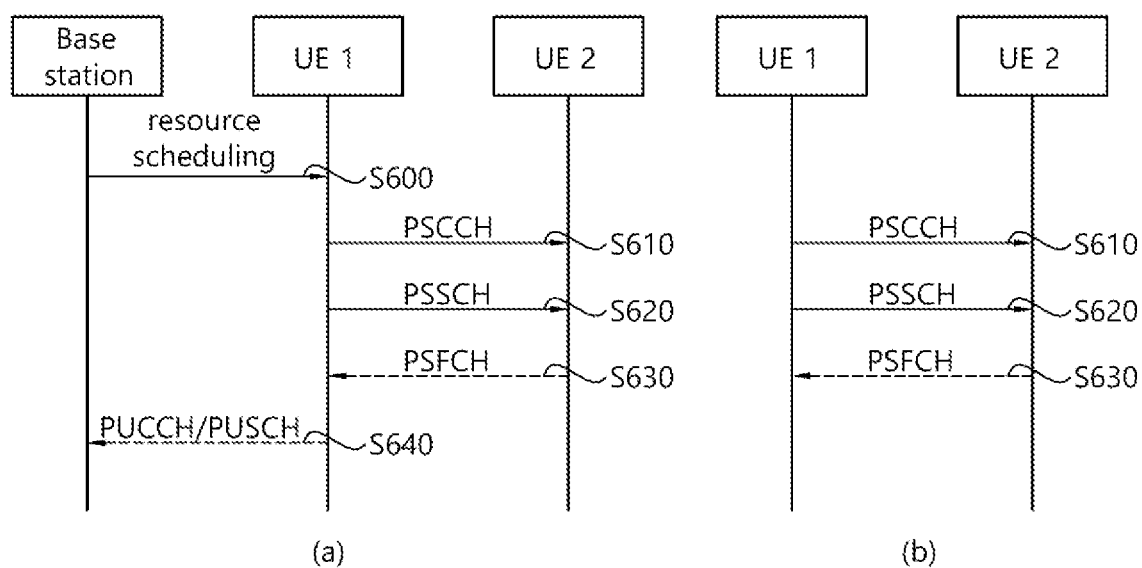
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUS CH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/ report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI:

Resource pool index—ceiling ($\log_2 I$) bits, where I is the number of resource pools for transmission configured by the higher layer parameter sl-TxPoolScheduling.

Time gap—3 bits determined by higher layer parameter sl-DCI-ToSL-Trans

HARQ process number—4 bits

New data indicator—1 bit

Lowest index of the subchannel allocation to the initial transmission—ceiling ($\log_2(N^{SL}_{subChannel})$) bits SCI format 1-A fields: frequency resource assignment, time resource assignment PSFCH-to-HARQ feedback timing indicator—ceiling ($\log_2 N_{fb\_timing}$) bits, where $N_{fb\_timing}$ is the number of entries in the higher layer parameter sl-PSFCH-ToPUCCH.

PUCCH resource indicator—3 bits

Configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits, 2 bits if the UE is configured with pdsch-HARQ-ACK-Codebook=dynamic, 2 bits if the UE is configured with pdsch-HARQ-ACK-Codebook=semi-static Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/ PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the 2nd-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling ($\log_2 (N^{sL}_{subchannel}(N^{sL}_{subchannel}+1)/2)$) bits when the value of the higher layer parameter sl-MaxNumPerReserve is configured to 2; otherwise ceiling $\log_2(N^{SL}_{subChannel} (N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling ($\log_2 N_{pattern}$) bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits
New data indicator—1 bit
Redundancy version—2 bits
Source ID—8 bits
Destination ID—16 bits
HARQ feedback enabled/disabled indicator—1 bit
Cast type indicator—2 bits as defined in Table 7
CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
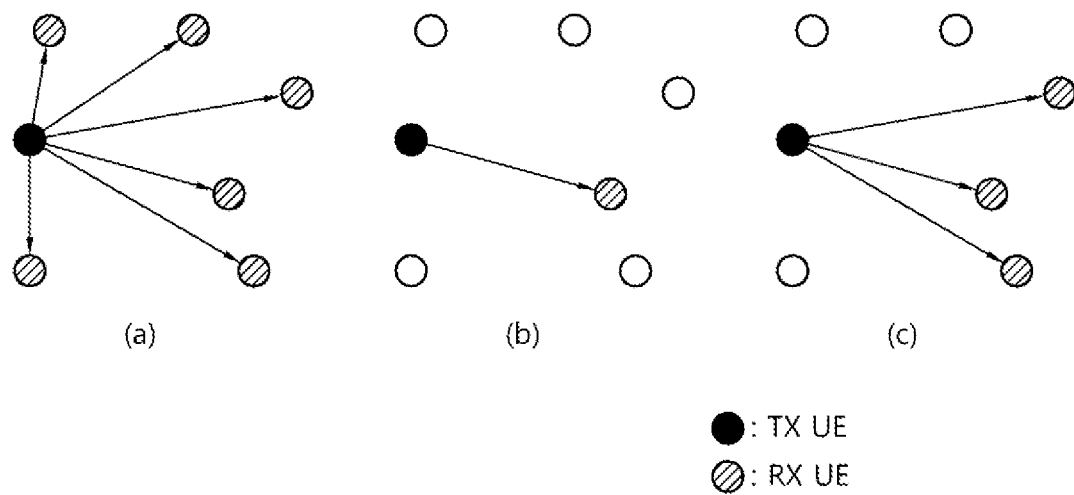
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure, HARQ-ACK may be referred to as ACK, ACK information, or positive-ACK information, and HARQ-NACK may be referred to as NACK, NACK information, or negative-ACK information.

Hereinafter, UE procedure for determining the subset of resources to be reported to higher layers in PSSCH resource selection in sidelink resource allocation mode 2 will be described.

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;
L1 priority, $prio_{TX}$;
the remaining packet delay budget;
the number of sub-channels to be used for the PSSCH/PSCCH transmission in a slot, $L_{subCH}$;
optionally, the resource reservation interval, $P_{rsvp\_TX}$, in units of msec.
if the higher layer requests the UE to determine a subset of resources from which the higher layer will select resources for PSSCH/PSCCH transmission as part of re-evaluation or pre-emption procedure, the higher layer provides a set of resources $(r_0, r_1, r_2, \ldots)$ which may be subject to re-evaluation and a set of resources $(r'_0, r'_1, r'_2, \ldots)$ which may be subject to pre-emption.
it is up to UE implementation to determine the subset of resources as requested by higher layers before or after the slot $r_1'' - T_3$, where $r_1''$ is the slot with the smallest slot index among $(r_0, r_1, r_2, \ldots)$ and $(r'_0, r'_1, r'_2, \ldots)$, and $T_3$ is equal to $T^{SL}_{proc,1}$, where $T^{SL}_{proc,1}$ is the number of slots determined based on the SCS configuration of the SL BWP.

The following higher layer parameters affect this procedure:

sl-SelectionWindowList: internal parameter $T_{2min}$ is set to the corresponding value from higher layer parameter sl-SelectionWindowList for the given value of $prio_{TX}$.
sl-Thres-RSRP-List: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $p_j = prio_{TX}$.
sl-RS-ForSensing selects if the UE uses the PSSCH-RSRP or PSCCH-RSRP measurement.
sl-ResourceReservePeriodList
sl-SensingWindow: internal parameter $T_0$ is defined as the number of slots corresponding to sl-SensingWindow msec.
sl-TxPercentageList: internal parameter X for a given $prio_{TX}$ is defined as sl-TxPercentageList ($prio_{TX}$) converted from percentage to ratio.
sl-PreemptionEnable: if sl-PreemptionEnable is provided, and if it is not equal to 'enabled', internal parameter $prio_{pre}$ is set to the higher layer provided parameter sl-PreemptionEnable.

The resource reservation interval, $P_{rsvp\_TX}$, if provided, is converted from units of msec to units of logical slots, resulting in $P'_{rsvp\_TX}$.

Notation:

$(t^{SL}_0, t^{SL}_1, t^{SL}_2, \ldots)$ denotes the set of slots which belongs to the sidelink resource pool.

For example, the UE may select a set of candidate resources (SA) based on Table 8. For example, if resource (re)selection is triggered, the UE may select a set of candidate resources (SA) based on Table 11. For example, if re-evaluation or pre-emption is triggered, the UE may select a set of candidate resources (SA) based on Table 8.

TABLE 8

The following steps are used:
1) A candidate single-slot resource for transmission $R_{x,y}$ is defined as a set of $L_{subCH}$ contiguous sub-channels with sub-channel $x + j$ in slot $t_y'^{SL}$ where $j = 0, \ldots, L_{subCH} - 1$. The UE shall assume that any set of $L_{subCH}$ contiguous sub-channels included in the corresponding resource pool within the time interval $[n + T_1, n + T_2]$ correspond to one candidate single-slot resource, where
   selection of $T_1$ is up to UE implementation under $0 \leq T_1 \leq T_{proc,1}^{SL}$, where $T_{proc,1}^{SL}$ is defined in slots in Table 8.1.4-2 where $\mu_{SL}$ is the SCS configuration of the SL BWP;
   if $T_{2min}$ is shorter than the remaining packet delay budget (in slots) then $T_2$ is up to UE implementation subject to $T_{2min} \leq T_2 \leq$ remaining packet delay budget (in slots); otherwise $T_2$ is set to the remaining packet delay budget (in slots).
   The total number of candidate single-slot resources is denoted by $M_{total}$.
2) The sensing window is defined by the range of slots $[n - T_0, n - T_{proc,0}^{SL})$ where $T_0$ is defined above and $T_{proc,0}^{SL}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.
3) The internal parameter $Th(p_i, p_j)$ is set to the corresponding value of RSRP threshold indicated by the i-th field in sl-Thres-RSRP-List, where $i = p_i + (p_j - 1) * 8$.
4) The set $S_A$ is initialized to the set of all the candidate single-slot resources.
5) The UE shall exclude any candidate single-slot resource $R_{x,y}$ from the set $S_A$ if it meets all the following conditions:
   the UE has not monitored slot $t_m'^{SL}$ in Step 2.
   for any periodicity value allowed by the higher layer parameter sl-ResourceReservePeriodList and a hypothetical SCI format 1-A received in slot $t_m'^{SL}$ with 'Resource reservation period' field set to that periodicity value and indicating all subchannels of the resource pool in this slot, condition c in step 6 would be met.
5a) If the number of candidate single-slot resources $R_{x,y}$ remaining in the set $S_A$ is smaller than $X \cdot M_{total}$, the set $S_A$ is initialized to the set of all the candidate single-slot resources as in step 4.
6) The UE shall exclude any candidate single-slot resource $R_{x,y}$ from the set $S_A$ if it meets all the following conditions:
   a) the UE receives an SCI format 1-A in slot $t_m'^{SL}$, and 'Resource reservation period' field, if present, and 'Priority' field in the received SCI format 1-A indicate the values $P_{rsvp\_RX}$ and $prio_{RX}$, respectively;
   b) the RSRP measurement performed, for the received SCI format 1-A, is higher than $Th(prio_{RX}, prio_{TX})$;
   c) the SCI format received in slot $t_m'^{SL}$ or the same SCI format which, if and only if the 'Resource reservation period' field is present in the received SCI format 1-A, is assumed to be received in slot(s) $t_{m+q \times P_{rsvp\_RX}'}^{'SL}$ determines the set of resource blocks and slots which overlaps with $R_{x,y+j \times P_{rsvp\_TX}}$, for $q = 1, 2, \ldots, Q$ and $j = 0, 1, \ldots, C_{reset} - 1$. Here, $P_{rsvp\_RX}'$ is $P_{rsvp\_RX}$ converted to units of logical slots, $Q = \left\lceil \dfrac{T_{scal}}{P_{rsvp\_RX}} \right\rceil$ if $P_{rsvp\_RX} < T_{scal}$ and $n' - m \leq P_{rsvp\_RX}'$, where $t_{n'}'^{SL} = n$ if slot n belongs to the set $(t_0'^{SL}, t_1'^{SL}, \ldots, t_{Tmax-1}'^{SL})$, otherwise slot $t_{n'}'^{SL}$ is the first slot after slot n belonging to the set $(t_0'^{SL}, t_1'^{SL}, \ldots, t_{Tmax-1}'^{SL})$ otherwise $Q = 1$. $T_{scal}$ is set to selection window size $T_2$ converted to units of msec.
7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4.
The UE shall report set $S_A$ to higher layers.
If a resource $r_i$ from the set $(r_0, r_1, r_2, \ldots)$ is not a member of $S_A$, then the UE shall report re-evaluation of the resource $r_i$ to higher layers.
If a resource $r_i'$ from the set $(r_0', r_1', r_2', \ldots)$ meets the conditions below then the UE shall report pre-emption of the resource $r_i'$ to higher layers
   $r_i'$ is not a member of $S_A$, and
   $r_i'$ meets the conditions for exclusion in step 6, with $Th(prio_{RX}, prio_{TX})$ set to the final threshold after executing steps 1)-7), i.e. including all necessary increments for reaching $X \cdot M_{total}$, and the associated priority $prio_{RX}$, satisfies one of the following conditions:
      sl-PreemptionEnable is provided and is equal to 'enabled' and $prio_{TX} > prio_{RX}$
      sl-PreemptionEnable is provided and is not equal to 'enabled', and $prio_{RX} < prio_{pre}$ and $prio_{TX} > prio_{RX}$ Meanwhile, partial sensing may be supported for power saving of the UE. For example, in LTE SL or LTE V2X, the UE may perform partial sensing based on Tables 9 and 10.

TABLE 9

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers.
In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers.

TABLE 9-continued $C_{resel}$ is determined by $C_{resel}$ = 10 * SL_RESOURCE_RESELECTION_COUNTER, where SL_RESOURCE_RESELECTION_COUNTER is provided by higher layers.
If partial sensing is configured by higher layers then the following steps are used:
1) A candidate single-subframe resource for PSSCH transmission $R_{x,y}$ is defined as a set of $L_{subCH}$ contiguous sub-channels with sub-channel x + j in subframe $t_y^{SL}$ where j = 0, . . . , $L_{subCH}$ − 1. The UE shall determine by its implementation a set of subframes which consists of at least Y subframes within the time interval [n + $T_1$, n + $T_2$] where selections of $T_1$ and $T_2$ are up to UE implementations under $T_1 \leq 4$ and $T_{2min}$ ($prio_{TX}$) $\leq T_2 \leq 100$, if $T_{2min}$ ($prio_{TX}$) is provided by higher layers for $prio_{TX}$, otherwise $20 \leq T_2 \leq 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool within the determined set of subframes correspond to one candidate single-subframe resource. The total number of the candidate single-subframe resources is denoted by $M_{total}$.
2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSST measured in these subframes.
3) The parameter $Th_{a,b}$ is set to the value indicated by the i-th SL-ThresPSSCH-RSRP field in SL-ThresPSSCH-RSRP-List where i = (a − 1) * 8 + b.
4) The set $S_A$ is initialized to the union of all the candidate single-subframe resources. The set $S_B$ is initialized to an empty set.
5) The UE shall exclude any candidate single-subframe resource $R_{x,y}$ from the set $S_A$ if it meets all the following conditions:
the UE receives an SCI format 1 in subframe $t_m^{SL}$, and "Resource reservation" field and "Priority" field in the received SCI format 1 indicate the values $P_{rsvp\_RX}$ and $prio_{RX}$, respectively.
PSSCH-RSRP measurement according to the received SCI format 1 is higher than $Th_{prio_{TX},prio_{RX}}$.
the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P_{rsvp\_TX}}'$ for q = 1, 2, . . . , Q and j = 0, 1, . . . , $C_{resel}$ − 1. Here, $$Q = \frac{1}{P_{rsvp\_RX}} \text{ if } P_{rsvp\_RX} < 1 \text{ and } y' - m \leq P_{step} \times P_{rsvp\_RX} + P_{step}, \text{ where } t_{y'}^{SL} \text{ is the}$$

last subframe of the Y subframes, and Q = 1 otherwise.
6) If the number of candidate single-subframe resources remaining in the set $S_A$ is smaller than $0.2 \cdot M_{total}$, then Step 4 is repeated with $Th_{a,b}$ increased by 3 dB.

TABLE 10

7) For a candidate single-subframe resource $R_{x,y}$ remaining in the set $S_A$, the metric $E_{x,y}$ is defined as the linear average of S-RSSI measured in sub-channels x+k for k = 0, . . . , $L_{subCH}$ - 1 in the monitored subframes in Step 2 that can be expressed by $t_{y-P_{step}*j}^{SL}$ for a non-negative integer j.
8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.
9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time.
The UE shall report set $S_B$ to higher layers.
If transmission based on random selection is configured by upper layers and when the UE is configured by upper layers to transmit using resource pools on multiple carriers, the following steps are used:
1) A candidate single-subframe resource for PSSCH transmission $R_{x,y}$ is defined as a set of $L_{subCH}$ contiguous sub-channels with sub-channel x+j in subframe $t_y^{SL}$ where j = 0, . . . , $L_{subCH}$ - 1. The UE shall assume that any set of $L_{subCH}$ contiguous sub-channels included in the corresponding PSSCH resource pool within the time interval [n + $T_1$, n + $T_2$] corresponds to one candidate single-subframe resource, where selections of $T_1$ and $T_2$ are up to UE implementations under $T_1 \leq 4$ and $T_{2min}$ ($prio_{TX}$) $\leq T_2 \leq 100$, if $T_{2min}$ ($prio_{TX}$) is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.
2) The set $S_A$ is initialized to the union of all the candidate single-subframe resources. The set $S_B$ is initialized to an empty set.
3) The UE moves the candidate single-subframe resource $R_{x,y}$ from the set $S_A$ to $S_B$.
4) The UE shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time.
The UE shall report set $S_B$ to higher layers.

Meanwhile, the conventional candidate resource selection method has a problem of performance (or capability) degradation, which is caused by applying only random selection for a first packet of periodic transmission.

Meanwhile, when a UE performs partial sensing, the UE needs to determine a range of partial sensing (e.g., range/number of slots being the target (or object) of partial sensing). For example, when the partial sensing range is not defined, the UE may perform monitoring during a relatively long time period (or time duration), and this may cause unnecessary power consumption of the UE. For example, when the partial sensing range is not defined, the UE may perform monitoring during a relatively short time period (or time duration). In this case, the UE may not determine resource conflict (or resource collision) with another UE, and, due to such resource conflict, reliability in SL transmission may not be ensured. In the present disclosure, partial sensing may include periodic-based partial sensing (PPS) or continuous partial sensing (CPS). In the present disclosure, PPS may also be referred to as PBPS.

According to various embodiments of the present disclosure, proposed herein are a method for selectively applying random selection and CPS based resource selection for the first packet of a periodic transmission and an apparatus supporting the same. According to various embodiments of the present disclosure, proposed herein are an SL transmission resource selection method and an apparatus supporting the same that can minimize power consumption of the UE, when the UE is operating based on partial sensing.

For example, in various embodiments of the present disclosure, when performing sensing for resource selection, based on a number of cycle periods corresponding to a specific configuration value, periodic-based partial sensing (PPS) may mean an operation performing sensing at time points corresponding to an integer multiple (k) of each cycle period. For example, the cycle periods may be cycle periods of transmission resource configured in a resource pool. For example, PPS may sense resource of a time point temporally preceding a time point of a candidate resource, which is to be a target that determines resource conflict, as much as the integer multiple k value of each cycle period. For example, the k value may be configured to have a bitmap format.

Figure 8:
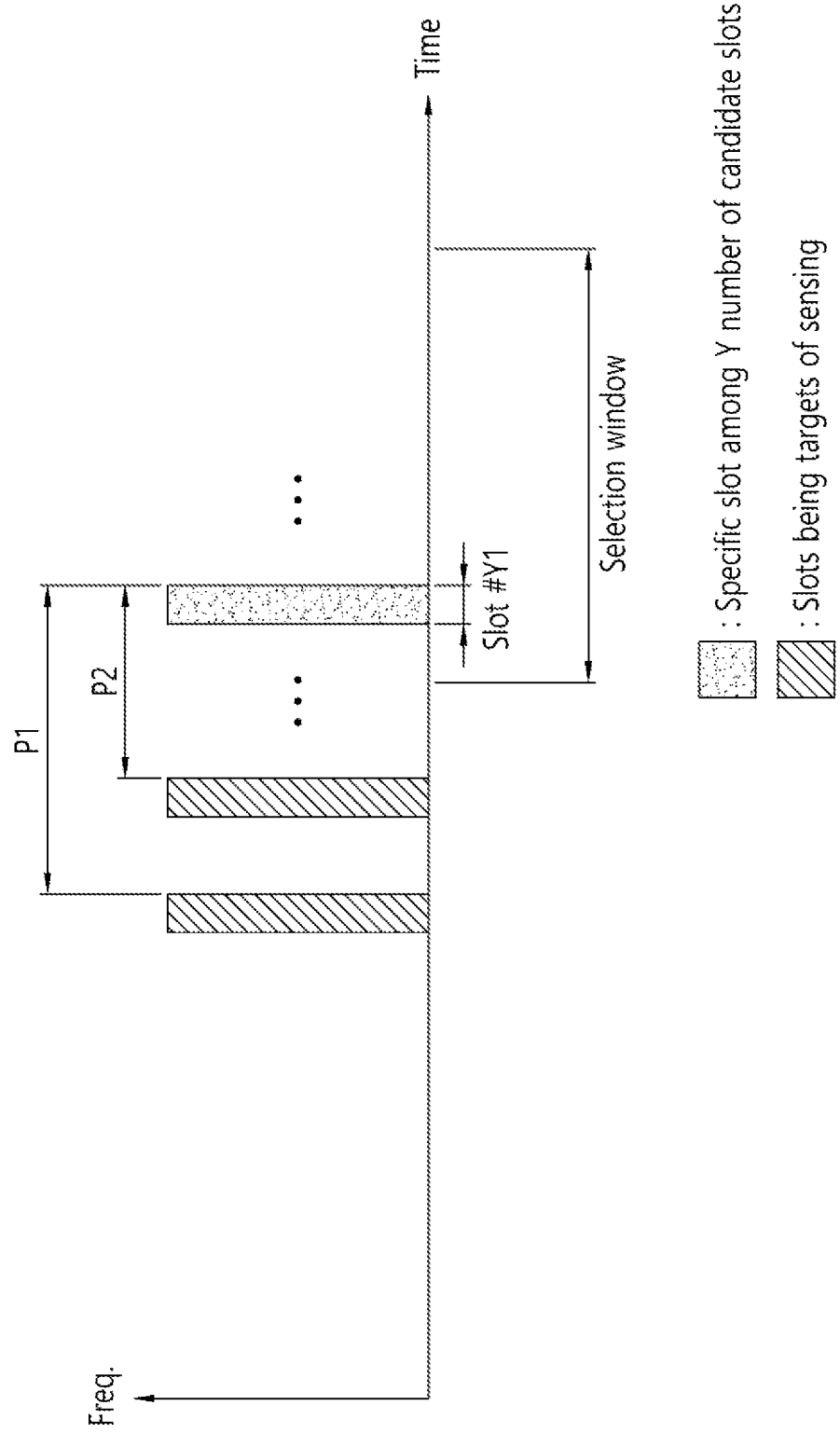
FIG. 8 shows a method for performing PPS, by a UE, in accordance with an embodiment of the present disclosure.
Figure 9:
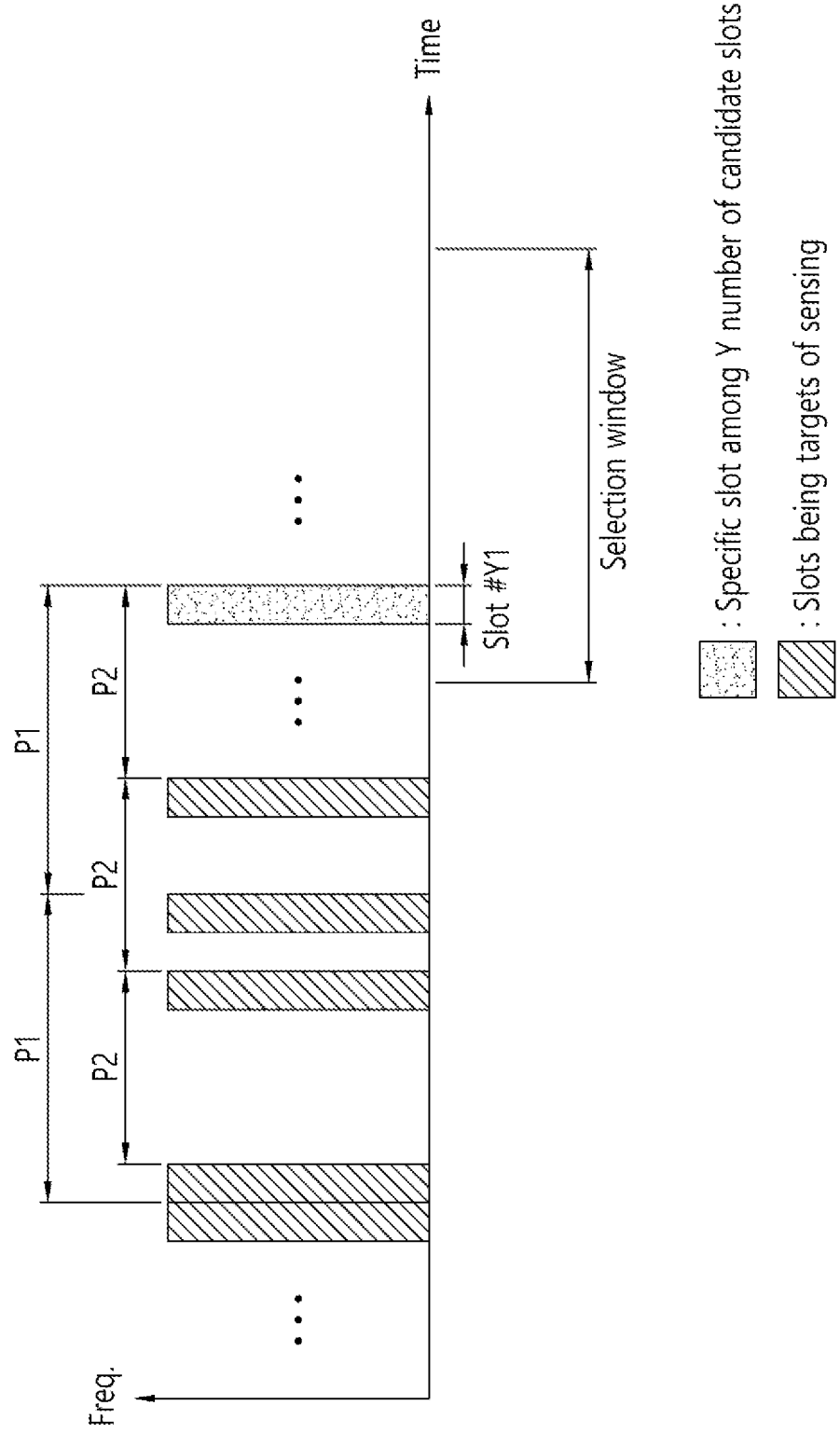
FIG. 9 shows a method for performing PPS, by a UE, in accordance with an embodiment of the present disclosure.

FIG. 8 and FIG. 9 respectively show a method for performing PPS, by a UE, in accordance with an embodiment of the present disclosure. FIG. 8 and FIG. 9 may be combined with various embodiments of the present disclosure.

In the embodiments of FIG. 8 and FIG. 9, it is assumed that a resource reservation cycle period that is allowed for a resource pool or a resource reservation cycle period that is configured for PPS are P1 and P2, respectively. Furthermore, it is assumed that a UE performs partial sensing (i.e., PPS) for selecting SL resource within slot #Y1.

Referring FIG. 8, a UE may perform sensing for a slot that precedes slot #Y1 (or that is located before slot #Y1) by P1 and a slot that precedes slot #Y1 by P2.

Referring FIG. 9, a UE may perform sensing for a slot that precedes slot #Y1 (or that is located before slot #Y1) by P1 and a slot that precedes slot #Y1 by P2. Furthermore, optionally, the UE may perform sensing for a slot that precedes slot #Y1 by A*P1 and a slot that precedes slot #Y1 by B*P2. For example, A and B may be positive integers that are equal to or greater than 2. More specifically, for example, a UE that has selected slot #Y1 as a candidate slot may perform sensing for slot #(Y1-resource reservation cycle period*k), and k may be a bitmap. For example, when k is equal to 10001, a UE that has selected slot #Y1 as a candidate slot may perform sensing for slot #(Y1-P1*1), slot #(Y1-P1*5), slot #(Y1-P2*1), and slot #(Y1-P2*5).

For example, in various embodiments of the present disclosure, continuous partial sensing (CPS) may mean an operation performing sensing for all or part of a time domain that is given as a specific configuration value. For example, CPS may include a short-term sensing operation that performs sensing during a relatively short time period (or time duration).

Figure 10:
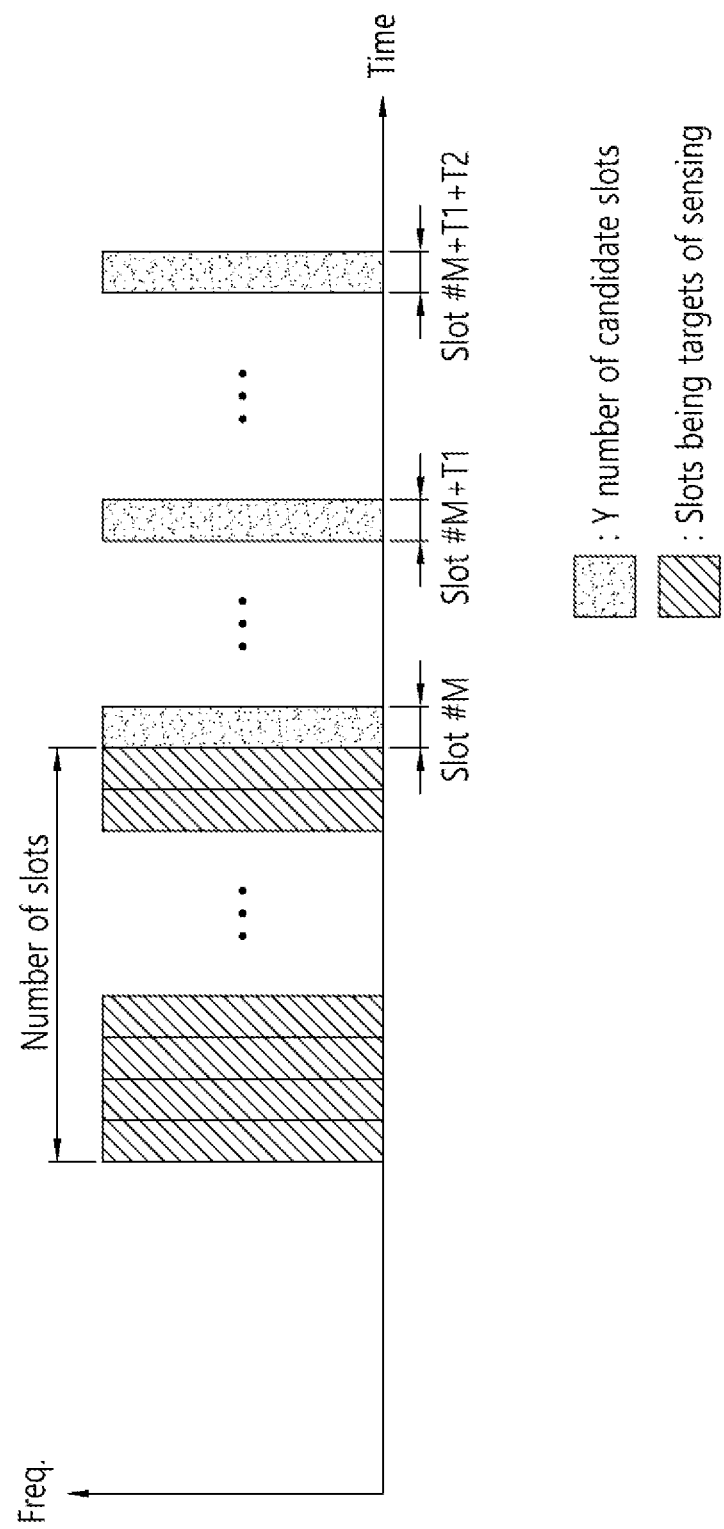
FIG. 10 shows a method for performing CPS, by a UE, in accordance with an embodiment of the present disclosure.

FIG. 10 shows a method for performing CPS, by a UE, in accordance with an embodiment of the present disclosure. FIG. 10 may be combined with various embodiments of the present disclosure.

In the embodiment of FIG. 10, it is assumed that Y number of candidate slots that are selected by a UE are slot #M, slot #(M+T1), and slot #(M+T1+T2). In this case, the slot(s) for which the UE should perform sensing may be determined based on a first slot (i.e., slot #M) among the Y number of candidate slots. For example, after determining the first slot among the Y number of candidate slots as a reference slot, the UE may perform sensing for N number of slots (preceding) from the reference slot.

Referring to FIG. 10, based on the first slot (i.e., slot #M) among the Y number of candidate slots, the UE may perform sensing on N number of slots. For example, the UE may perform sensing for N number of slots preceding slot #M, and the UE may select at least one SL resource from within the Y number of candidate slots (i.e., slot #M, slot #(M+T1), and slot #(M+T1+T2)), based on the sensing result. For example, N may be configured for the UE or may be pre-configured. For example, among the N number of slots, a time gap for processing may exist between the last slot and slot #M.

In an embodiment of the present disclosure, REV may mean resource re-evaluation, and PEC may mean resource pre-emption checking.

In an embodiment of the present disclosure, when a transmission resource selection is initially triggered for transmitting a random packet, a resource selection window for performing sensing (e.g., full, partial sensing) may be selected, and a "candidate resource/slot" may mean resource that is selected for detecting the occurrence or non-occurrence of resource conflict within the resource selection window, a "valid resource/slot" is a resource that has been determined to be valid (or effective) for transmission, since resource conflict has not been detected among the candidate resources based on the sensing, and, then, reported from a PHY layer to a MAC layer, and a "transmission resource/slot" may mean a resource that has been finally selected, by the MAC layer, among the reported resources, in order to be used for an SL transmission.

Figure 11:
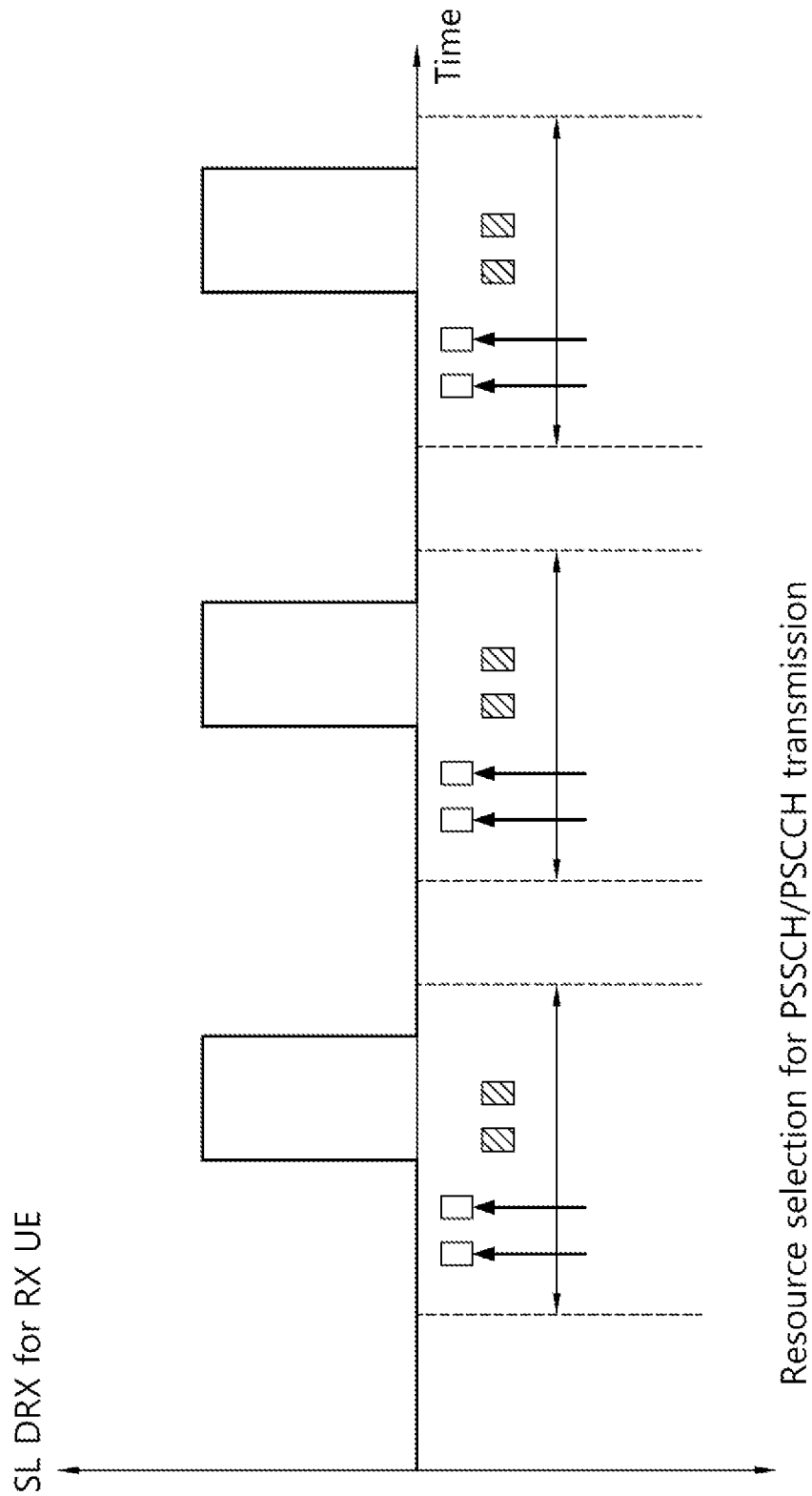
FIG. 11 is a diagram for describing problems of a method for performing wireless communication based on SL resource, in accordance with an embodiment of the present disclosure.

FIG. 11 is a diagram for describing problems of a method for performing wireless communication based on SL resource, in accordance with an embodiment of the present disclosure. FIG. 11 may be combined with various embodiments of the present disclosure.

Referring to FIG. 11, according to an embodiment of the present disclosure, for example, an RX UE may perform an SL DRX operation based on SL DRX configuration. For example, an RX UE may perform reception/monitoring of a TB (e.g., or MAC PDU) (e.g., reception/monitoring of a PSCCH/PSSCH) within an SL DRX active time. For example, an RX UE may not perform reception/monitoring of a TB (e.g., or MAC PDU) (e.g., reception/monitoring of a PSCCH/PSSCH) within an SL DRX inactive time.

For example, a TX UE may select a candidate resource from a set of candidate resources (e.g., candidate single-slot resources) that are initialized within a selection window. For example, a TX UE may monitor a slot belonging to an SL resource pool within a sensing window and in a region excluding slots in which transmission of a TX UE occurs. For example, a TX UE may measure a reference signal received power (RSRP) from the slot and may select an SL resource based on the measured RSRP and decoding of the PSCCH. For example, a TX UE may perform RSRP measurement based on a first SCI, and, when the RSRP is higher (or greater) than an RSRP threshold (e.g., an RSRP threshold that is determined based on a transmission (L1) priority (prioTX) and a reception priority (prioRX) included in the received first SCI), the TX UE may exclude candidate resources being related to the first SCI based on partial sensing or full sensing. For example, for the TX UE, when a remaining number of candidate resources is less than a threshold (e.g., a value multiplying a total number of candidate resources (e.g., M) by a parameter (e.g., X, a value between 0 and 1) that is related to a transmission priority (e.g., prioTX)), the RSRP threshold may be incremented (or increased) N number of times as much as a predetermined step value (e.g., 3 dB). For example, N may be equal to 0 or may be a positive integer. For example, a TX UE may perform exclusion of candidate resources based on the (e.g., incremented (or increased)) RSRP threshold.

For example, the TX UE may report, to a MAC layer, valid resource(s)/slot(s) being selected (e.g., remaining after the exclusion) based on partial sensing or full sensing among the candidate resources/slots within a selection window. For example, the TX UE may perform SL communication with an RX UE based on an SL resource/slot that is finally selected, by the MAC layer, in order to be used for SL transmission among the reported resources.

For example, the candidate resource/slot may be selected within the selection window and within a region excluding the SL DRX active time (e.g., an SL DRX inactive time within an SL DRX cycle) based on the sensing. For example, the TX UE may perform SL communication with an RX UE based on the SL resource/slot that is finally selected from among candidate resources/slots that are selected from the region excluding the SL DRX active time.

In this case, for example, when the TX UE selects an SL resource based on full sensing or continuous partial sensing (CPS), the TX UE may perform unnecessary (re-)transmission due to an SL DRX operation of the RX UE. For example, when the TX UE selects an SL resource based on periodic-based partial sensing (PBPS), the TX UE may continuously perform unnecessary (re-)transmission due to the SL DRX operation of the RX UE. For example, power of the TX UE and the RX UE may be wasted. For example, the SL resource of the TX UE that is selected based on resource allocation mode 2 (e.g., or mode 4) may be wasted.

According to an embodiment of the present disclosure, for example, partial sensing may be operated in combination with SL discontinuous reception (DRX). For example, when a UE performing partial sensing during SL DRX operation performs periodic transmission, and when the UE selects a candidate resource, and, by applying an RSRP threshold value, the UE may not be capable of efficiently selecting a resource.

According to an embodiment of the present disclosure, a UE performing partial sensing during SL DRX operation may adaptively select an RSRP threshold value, and the UE may efficiently select a resource.

According to an embodiment of the present disclosure, when a power-saving UE performs partial sensing based resource allocation while performing an SL-DRX operation at the same time, the TX UE performing the SL DRX operation may select a transmission resource based on (or while considering) the SL-DRX configuration on an RX UE.

According to an embodiment of the present disclosure, for example, the TX UE may perform initial transmission or partial re-transmission on a packet that is to be transmitted during or (within) an ON period (or duration) or SL DRX Active time period of the RX UE, and the TX UE may anticipate (or expect) the RX UE to extend its SL DRX Active time period based on the initial transmission and the partial re-transmission, and the TX UE may perform the remaining re-transmission excluding the initial transmission and the partial re-transmission during the expected extended SL DRX Active time period.

As an embodiment of the present disclosure, for example, when the TX UE performs periodic transmission, and/or when a length (or duration) of the ON or SL DRX Active time period of the RX UE is less than or equal to a specific threshold value, as compared to a length of a Packet Delay Budget (PDB) or resource selection window of a packet that is to be transmitted, a maximum (or highest) reference signal received power (RSRP) threshold value (e.g., maximum (or highest) RSRP threshold value that is used for determining whether or not a resource conflict occurs when the TX UE selects a resource based on partial sensing) and/or an RSRP step value (e.g., the RSRP unit being a unit that increases the RSRP threshold when the number of valid resources is insufficient) may be configured as a specific threshold value.

As an embodiment of the present disclosure, for example, when the TX UE selects a valid resource within the ON or SL DRX Active time period of the RX UE, even if the RSRP threshold value increases up to the aforementioned maximum (or highest) value in order to meet with (or satisfy) a target resource ratio that is configured as a specific threshold value, in case the number of valid resources that can be selected by the TX UE fails to satisfy the target resource ratio, the TX UE may select a valid resource for a period that is expected to have the ON or SL DRX Active time period of the RX UE extended based on the transmission during the ON or SL DRX Active time period. For example, even if the RSRP threshold value increases up to the highest (or maximum) value for the period for which the extension of the ON or SL DRX Active time period of the RX UE is expected, if the number/ratio of valid resources does not satisfy the target resource number/target resource ratio, the TX UE may select a valid resource while increasing the RSRP threshold value to its maximum (or highest) value within a PDB or resource selection window period of the remaining packet(s) that is/are to be transmitted. For example, in case the number/ratio of valid resources fail(s) to satisfy the target resource number/target resource ratio even if the RSRP threshold value within the PDB or resource selection window period of the remaining packet(s) that is/are to be transmitted is increased up to the highest (or maximum) value, the TX UE may cancel the maximum RSRP threshold value, and the TX UE may select a valid resource while assuming an infinite maximum value and incrementing (or increasing) the RSRP threshold value by an order of the ON or SL DRX Active time period, the expected extended SL DRX time Active time period, and the remaining PDB or resource selection window period.

As an embodiment of the present disclosure, for example, the maximum RSRP threshold value and/or RSRP step value that is/are used for each of the ON or SL DRX Active time period, the expected extended SL DRX time Active time period, and the remaining PDB or resource selection window period may be separately configured so as to be different from one another. As an embodiment of the present disclosure, for example, a common or separate highest RSRP threshold value may be configured for all or part of the ON or SL DRX Active time period, the expected extended SL DRX time Active time period, and the remaining PDB or resource selection window period. As an embodiment of the present disclosure, for example, the RSRP step value that is applied to the ON or SL DRX Active time period may be configured to have a greater value than the RSRP step value that is applied to the expected extended SL DRX time Active time period or the remaining resource selection window period. As an embodiment of the present disclosure, for example, the maximum RSRP threshold value that is used for each of the ON or SL DRX Active time period, the expected extended SL DRX time Active time period, and the remaining PDB or resource selection window period may each be separately configured to have the maximum value cancelled or increased up to an infinite value.

As an embodiment of the present disclosure, for example, the RSRP step value that is applied to the ON or SL DRX Active time period may be configured to have a greater value than the RSRP step value that is applied to the expected extended SL DRX time Active time period or the remaining resource selection window period. As an embodiment of the present disclosure, for example, the maximum RSRP threshold value that is used for each of the ON or SL DRX Active time period, the expected extended SL DRX time Active time period, and the remaining PDB or resource selection window period may each be separately configured to have the maximum value cancelled or increased up to an infinite value.

As an embodiment of the present disclosure, for example, when the TX UE selects a valid resource from among candidate resources based on partial sensing within a resource selection window, initially, the RSRP threshold value may be commonly applied to the ON or SL DRX Active time period, the expected extended SL DRX time Active time period, and the remaining resource selection window period.

For example, according to the resource selection process, as the RSRP threshold value is sequentially increased as much as a specific configuration value, after the number/ratio of candidate resources for a whole resource selection window satisfies target resource number #1/target resource ratio #1 being configured as a specific threshold value, when the number/ratio of valid resources within the ON or SL DRX Active time period is less than target resource number #2/target resource ratio #2 being configured as a specific threshold value, as the TX UE sequentially increases the RSRP threshold value as much as the specific configuration value only for the ON or SL DRX Active time period, the TX UE may select additional valid resources only for the ON or SL DRX Active time period until the target resource number #2/target resource ratio #2 is/are satisfied.

For example, (e.g., as the RSRP threshold value is sequentially increased as much as a specific configuration value,) after the number/ratio of candidate resources for a whole resource selection window satisfies target resource number #1/target resource ratio #1 being configured as a specific threshold value, when the number/ratio of valid resources within the ON or SL DRX Active time period is less than target resource number #2/target resource ratio #2 being configured as a specific threshold value, (e.g., as the TX UE sequentially increases the RSRP threshold value as much as the specific configuration value only for the ON or SL DRX Active time period) the TX UE may select additional valid resources only for the ON or SL DRX Active time period until the target resource number #2/target resource ratio #2 is/are satisfied.

As an embodiment of the present disclosure, for example, when an SL DRX active time of the RX UE is provided by a higher layer (e.g., a radio resource control (RRC) layer) and when candidate single-slot resources remained within the SL DRX active time is not present in the set, based on its implementation, the UE may perform additional selection, and the set SA may include at least one candidate single-slot resource within the SL DRX active time.

Figure 12:
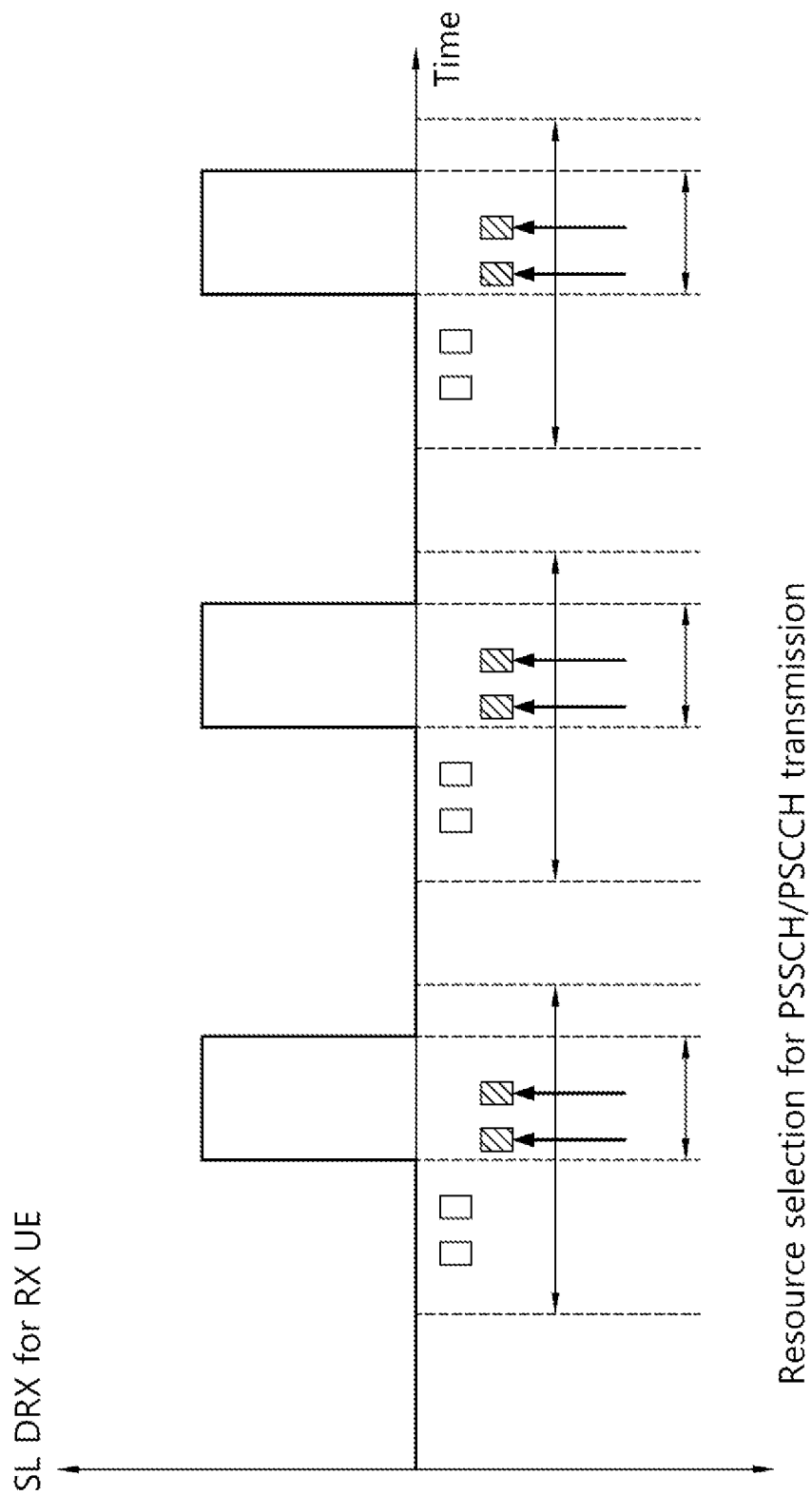
FIG. 12 is a diagram for describing a method for performing wireless communication based on SL resource, in accordance with an embodiment of the present disclosure.

FIG. 12 is a diagram for describing a method for performing wireless communication based on SL resource, in accordance with an embodiment of the present disclosure. FIG. 12 may be combined with various embodiments of the present disclosure.

Referring to FIG. 12, according to an embodiment of the present disclosure, for example, an RX UE may perform an SL DRX operation based on SL DRX configuration. For example, an RX UE may perform reception/monitoring of a TB (e.g., or MAC PDU) (e.g., reception/monitoring of a PSCCH/PSSCH) within an SL DRX active time. For example, an RX UE may not perform reception/monitoring of a TB (e.g., or MAC PDU) (e.g., reception/monitoring of a PSCCH/PSSCH) within an SL DRX inactive time.

For example, a TX UE may select a candidate resource from a set of candidate resources (e.g., candidate single-slot resources) that are initialized within a selection window. For example, a TX UE may monitor a slot belonging to an SL resource pool within a sensing window and in a region excluding slots in which transmission of a TX UE occurs. For example, a TX UE may measure a reference signal received power (RSRP) from the slot and may select an SL resource based on the measured RSRP and decoding of the PSCCH. For example, a TX UE may perform RSRP measurement based on a first SCI, and, when the RSRP is higher (or greater) than an RSRP threshold (e.g., an RSRP threshold that is determined based on a transmission (L1) priority (prioTX) and a reception priority (prioRX) included in the received first SCI), the TX UE may exclude candidate resources being related to the first SCI based on partial sensing or full sensing. For example, for the TX UE, when a remaining number of candidate resources is less than a threshold (e.g., a value multiplying a total number of candidate resources (e.g., M) by a parameter (e.g., X, a value between 0 and 1) that is related to a transmission priority (e.g., prioTX)), the RSRP threshold may be incremented (or increased) N number of times as much as a predetermined step value (e.g., 3 dB). For example, N may be equal to 0 or may be a positive integer. For example, a TX UE may perform sensing and exclusion of candidate resources based on the (e.g., incremented (or increased)) RSRP threshold.

For example, based on sensing, the TX UE may determine whether a number of remained candidate resources/slots within an SL DRX active time of an RX UE, among a set of selected candidate resources/slots (e.g., candidate resources/slots remaining after exclusion), is less than a threshold value. For example, the threshold value may be integer that is equal to or greater than 1. For example, when the number of remained candidate resources/slots within the SL DRX active time of the RX UE is less than the threshold value, the TX UE may additionally select at least one or more candidate resources/slots within the SL DRX active time (e.g., within the SL DRX active time within an SL DRX cycle) of the RX UE. For example, when there are no remained candidate resources/slots within the SL DRX active time of the RX UE, the TX UE may additionally select at least one or more candidate resources/slots within the SL DRX active time (e.g., within the SL DRX active time within an SL DRX cycle) of the RX UE. For example, the TX UE may report, to the MAC layer, the additionally selected candidate resources/slots. For example, the TX UE may perform SL communication with the RX UE based on the finally selected SL resources/slots, among the reported resources, in order to be used, by the MAC layer, for SL transmission.

Therefore, according to an embodiment of the present disclosure, for example, when the TX UE selects an SL resource based on full sensing or continuous partial sensing (CPS), the TX UE may not perform unnecessary (re-)transmission due to an SL DRX operation of the RX UE. For example, when the TX UE selects an SL resource based on periodic-based partial sensing (PBPS), the TX UE may not continuously perform unnecessary (re-)transmission due to the SL DRX operation of the RX UE. For example, power of the TX UE and the RX UE may not be wasted. For example, the SL resource of the TX UE that is selected based on resource allocation mode 2 (e.g., or mode 4) may not be wasted.

Figure 13:
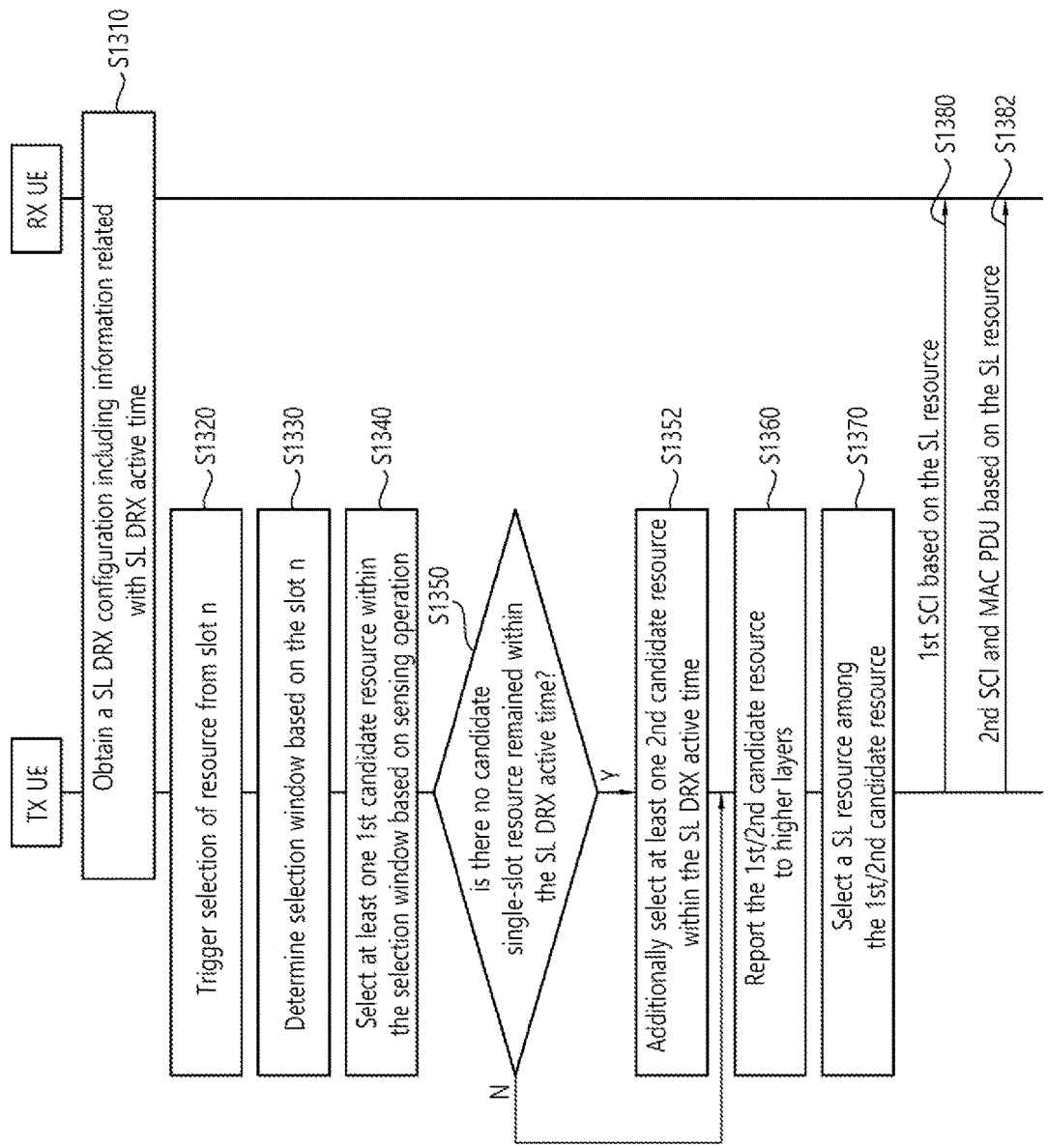
FIG. 13 is a diagram for describing a procedure of performing wireless communication based on SL resource, in accordance with an embodiment of the present disclosure.

FIG. 13 is a diagram for describing a procedure of performing wireless communication based on SL resource, in accordance with an embodiment of the present disclosure. FIG. 13 may be combined with various embodiments of the present disclosure.

Referring to FIG. 13, in step S1310, a TX UE and/or an RX UE may obtain SL DRX configuration including information related to an SL DRX active time. For example, the TX UE may transmit an SL DRX configuration to the RX UE based on a PC5-RRC connection, and the like. In step S1320, for example, the TX UE may trigger resource selected from slot n. In step S1330, for example, the TX UE may determine a selection window based on the slot n. In step S1340, for example, the TX UE may select at least one first candidate resource within the selection window. In step S1350, for example, whether or not remained candidate resources (e.g., candidate single-slot resources) are present during or (within) the SL DRX active time may be determined. For example, the TX UE may determine whether or not remained candidate resources (e.g., candidate single-slot resources) are present within the SL DRX active time. In step S1352, for example, when there are no remained candidate resources (e.g., candidate single-slot resources) within the SL DRX active time, the TX UE may additionally select at least one second candidate resource within the SL DRX active time. In step S1360, for example, when at least one or more remained candidate resources (e.g., candidate single-slot resources) are present within the SL DRX active time, the TX UE may report the at least one first candidate resource to a higher layer (e.g., MAC layer) from a physical layer (PHY layer). For example, when there are no remained candidate resources (e.g., candidate single-slot resources) present within the SL DRX active time, the TX UE may report the at least one second candidate resource to a higher layer (e.g., MAC layer) from a physical layer (PHY layer). In step S1370, for example, the TX UE (e.g., a higher layer of the TX UE) may select an SL resource from among the candidate resources (e.g., at least one first candidate resource and/or at least one second candidate resource). In step S1380, for example, the TX UE may transmit a first SCI to the RX UE through a PSCCH, based on the SL resource (e.g., over the SL resource). In step S1390, for example, the TX UE may transmit a second SCI and a MAC PDU to the RX UE through a PSSCH, based on the SL resource (e.g., over the SL resource).

An embodiment of the present disclosure may have various effects. For example, according to an embodiment of the present disclosure, when a UE performing an SL DRX operation selects a transmission resource based on partial sensing, an RSRP threshold value may be applied based on an SL DRX configuration of the RX UE. According to an embodiment of the present disclosure, for example, the TX UE may efficiently select a candidate resource based on the SL DRX operation of the RX UE. According to an embodiment of the present disclosure, for example, the TX UE may efficiently select a candidate resource so as to minimize resource conflict based on the SL DRX operation of the RX UE. According to an embodiment of the present disclosure, for example, by having the TX UE efficiently select a candidate resource so as to minimize resource conflict based on the SL DRX operation of the RX UE, power consumption caused by unnecessary (re-)transmission during a time period that is not the SL DRX active time of the RX UE may be minimized. According to an embodiment of the present disclosure, for example, by having the TX UE efficiently select a candidate resource so as to minimize resource conflict based on the SL DRX operation of the RX UE, waste of resource caused by unnecessary (re-)transmission during a time period that is not the SL DRX active time of the RX UE may be minimized.

As an embodiment of the present disclosure, for example, when the TX UE selects a valid resource from among the candidate resources based on partial sensing within the resource selection window, for each of the ON or SL DRX Active time period, the expected extended SL DRX time Active time period, and the remaining resource selection window period, the target resource number/target resource ratio may be separately configured so as to be different from one another. For example, as the TX UE sequentially increases the RSRP threshold value until each target resource number/target resource ratio is satisfied for each of the ON or SL DRX Active time period, the expected extended SL DRX time Active time period, and the remaining resource selection window period, the TX UE may select a valid resource in each period.

As an embodiment of the present disclosure, for example, the target resource number/target resource ratio, RSRP threshold, RSRP step (increment) values, which are separately configured so as to be different from one another for each of the ON or SL DRX Active time period, the expected extended SL DRX time Active time period, and the remaining PDB or resource selection window period, may be determined based on channel congestion or interference level, Channel Busy Ratio (CBR)/Channel Occupancy Ratio (CR), PDB, transmission packet priority, minimum communication range requirement for a transmission packet, total number of (re-)transmissions/remaining number of retransmissions for a transmission packet, number of candidate/valid/transmission resources, resource selection window length, configuration or non-configuration of re-evaluation (REV)/pre-emption checking (PEC), cast type, size of packet that is to be transmitted, configuration or non-configuration of HARQ feedback enabled, and so on.

As an embodiment of the present disclosure, for example, when the TX UE selects a valid resource from among candidate resources based on partial sensing within the resource selection window, and when the target resource number/target resource ratio is/are not satisfied for each of the ON or SL DRX Active time period, the expected extended SL DRX time Active time period, and the remaining resource selection window period, the TX UE may align (or match) the transmission time points of the TX UE for each period or within the whole resource selection window so as to re-include the excluded valid resources or transmission resources and may then select the re-included resources as the valid resource or transmission resource.

As an embodiment of the present disclosure, for example, when the TX UE selects a valid resource from among candidate resources based on partial sensing within the resource selection window, when the target resource number/target resource ratio is/are not satisfied for each of the ON or SL DRX Active time period, the expected extended SL DRX time Active time period, and the remaining resource selection window period, or, for example, even if the transmission time points of the TX UE for each period or within the whole resource selection window are aligned (or matched) so as to re-include the excluded valid resources or transmission resources and then select the re-included resources as the valid resource or transmission resource, when the target resource number/target resource ratio is/are not satisfied for each of the ON or SL DRX Active time period, the expected extended SL DRX time Active time period, and the remaining resource selection window period, the UE (e.g., based on its implementation) may configure a partial sensing window or resource selection window so that the target resource number/target resource ratio for each of the aforementioned periods can be satisfied. For example, the TX UE may reduce a partial sensing window period that is required for resource selection before the resource selection window (e.g., contiguous partial sensing (CPS) period), and, thus, the TX UE may extend the resource selection window.

As an embodiment of the present disclosure, for example, in order to allow the RX UE to extend the ON or SL DRX Active time period and receive the remaining re-transmission(s) based on the transmission during the ON or SL DRX Active time period, since the likelihood of success in the transmission during the ON or SL DRX Active time period should be high, among the valid resources within the resource selection window that is reported from the PHY layer, the MAC layer of the TX UE may preferentially select a transmission resource within the ON or SL DRX Active time period from among resources having RSRP measurement values that are less than or equal to a specific threshold value among the resources within the ON or SL DRX Active time period.

As an embodiment of the present disclosure, for example, although the number/ratio of valid resources within the ON or SL DRX Active time period have been selected to be greater than or equal to the number/ratio of target valid resources of the corresponding period, when a number of valid resources within an OFF period has been selected to be less than a number of target valid resources of the corresponding period, or, for example, when a total number of valid resources within the resource selection window is selected to be less than a total number of target valid resources, the TX UE may additionally increase only the RSRP threshold for the OFF period, or the TX UE may cancel the maximum RSRP threshold value for the OFF period, or the TX UE may increase the RSRP step value for the OFF period. As an embodiment of the present disclosure, for example, the TX UE may re-include the excluded resources, which were excluded due to overlapping transmission time points of the UE for the OFF period, as candidate/valid resources, or the TX UE may secure additional candidate/valid resources for the OFF period by additionally extending the resource selection window.

As an embodiment of the present disclosure, for example, in order to allow the MAC layer of the TX UE to determine and to allow the PHY layer of the TX UE to perform, the TX UE may configure related parameters (e.g., cancelling maximum RSRP threshold value, increasing RSRP step, extending resource selection window, and so on), so as to be capable of performing operations according to the embodiment of the present disclosure, or, for example, the TX UE may perform the operations according to the embodiment of the present disclosure by having the PHY layer determine on its own.

For example, a parameter value that is related to the application or non-application of the aforementioned rule and/or that is related to the proposed method/rule of the present disclosure may be configured/allowed specifically to (or differently or independently from) a service type. For example, a parameter value that is related to the application or non-application of the aforementioned rule and/or that is related to the proposed method/rule of the present disclosure may be configured/allowed specifically to (or differently or independently from) (LCH or service) priority. For example, a parameter value that is related to the application or non-application of the aforementioned rule and/or that is related to the proposed method/rule of the present disclosure may be configured/allowed specifically to (or differently or independently from) QoS requirements (e.g., latency, reliability, minimum communication range). For example, a parameter value that is related to the application or non-application of the aforementioned rule and/or that is related to the proposed method/rule of the present disclosure may be configured/allowed specifically to (or differently or independently from) PQI parameters. For example, a parameter value that is related to the application or non-application of the aforementioned rule and/or that is related to the proposed method/rule of the present disclosure may be configured/allowed specifically to (or differently or independently from) HARQ feedback ENABLED LCH/MAC PDU (transmission). For example, a parameter value that is related to the application or non-application of the aforementioned rule and/or that is related to the proposed method/rule of the present disclosure may be configured/allowed specifically to (or differently or independently from) HARQ feedback DISABLED LCH/MAC PDU (transmission). For example, a parameter value that is related to the application or non-application of the aforementioned rule and/or that is related to the proposed method/rule of the present disclosure may be configured/allowed specifically to (or differently or independently from) a CBR measurement value of a resource pool. For example, a parameter value that is related to the application or non-application of the aforementioned rule and/or that is related to the proposed method/rule of the present disclosure may be configured/allowed specifically to (or differently or independently from) an SL cast type (e.g., unicast, groupcast, broadcast). For example, a parameter value that is related to the application or non-application of the aforementioned rule and/or that is related to the proposed method/rule of the present disclosure may be configured/allowed specifically to (or differently or independently from) an SL groupcast HARQ feedback option (e.g., NACK only feedback, ACK/NACK feedback, TX-RX range-based NACK only feedback). For example, a parameter value that is related to the application or non-application of the aforementioned rule and/or that is related to the proposed method/rule of the present disclosure may be configured/allowed specifically to (or differently or independently from) SL mode 1 CG type (e.g., SL CG type 1 or SL CG type 2). For example, a parameter value that is related to the application or non-application of the aforementioned rule and/or that is related to the proposed method/rule of the present disclosure may be configured/allowed specifically to (or differently or independently from) SL mode type (e.g., mode 1 or mode 2). For example, a parameter value that is related to the application or non-application of the aforementioned rule and/or that is related to the proposed method/rule of the present disclosure may be configured/allowed specifically to (or differently or independently from) a resource pool. For example, a parameter value that is related to the application or non-application of the aforementioned rule and/or that is related to the proposed method/rule of the present disclosure may be configured/allowed specifically to (or differently or independently from) whether or not the resource pool is configured of PSFCH resource. For example, a parameter value that is related to the application or non-application of the aforementioned rule and/or that is related to the proposed method/rule of the present disclosure may be configured/ allowed specifically to (or differently or independently from) a source (L2) ID. For example, a parameter value that is related to the application or non-application of the aforementioned rule and/or that is related to the proposed method/ rule of the present disclosure may be configured/allowed specifically to (or differently or independently from) a destination (L2) ID. For example, a parameter value that is related to the application or non-application of the aforementioned rule and/or that is related to the proposed method/ rule of the present disclosure may be configured/allowed specifically to (or differently or independently from) a PC5 RRC connection link. For example, a parameter value that is related to the application or non-application of the aforementioned rule and/or that is related to the proposed method/ rule of the present disclosure may be configured/allowed specifically to (or differently or independently from) an SL link. For example, a parameter value that is related to the application or non-application of the aforementioned rule and/or that is related to the proposed method/rule of the present disclosure may be configured/allowed specifically to (or differently or independently from) a connection status (with a base station) (e.g., RRC_CONNECTED state, IDLE state, INACTIVE state). For example, a parameter value that is related to the application or non-application of the aforementioned rule and/or that is related to the proposed method/ rule of the present disclosure may be configured/allowed specifically to (or differently or independently from) an SL HARQ process (ID). For example, a parameter value that is related to the application or non-application of the aforementioned rule and/or that is related to the proposed method/ rule of the present disclosure may be configured/allowed specifically to (or differently or independently from) a performance or non-performance of an SL DRX operation (of the TX UE or RX UE). For example, a parameter value that is related to the application or non-application of the aforementioned rule and/or that is related to the proposed method/rule of the present disclosure may be configured/ allowed specifically to (or differently or independently from) whether or not the (TX or RX) UE is a power saving UE. For example, a parameter value that is related to the application or non-application of the aforementioned rule and/or that is related to the proposed method/rule of the present disclosure may be configured/allowed specifically to (or differently or independently from) a case where PSFCH TX and PSFCH RX (and/or a plurality of PSFCH TXs (exceeding the UE capability)) overlap (in the viewpoint of a specific UE). For example, a parameter value that is related to the application or non-application of the aforementioned rule and/or that is related to the proposed method/rule of the present disclosure may be configured/allowed specifically to (or differently or independently from) a case where an RX UE has actually received PSCCH (and/or PSSCH) (re-)transmission (successfully) from a TX UE.

For example, in the present disclosure, the wording for configuration (or designation) may be extendedly interpreted as a form of informing (or notifying), by a base station, to a UE through a pre-defined (physical layer or higher layer) channel/signal (e.g., SIB, RRC, MAC CE) (and/or a form being provided through a pre-configuration and/or a form of informing (or notifying), by the UE, to another UE through a pre-defined (physical layer or higher layer) channel/signal (e.g., SL MAC CE, PC5 RRC)).

For example, in the present disclosure, the wording for PSFCH may be extendedly interpreted as (NR or LTE) PSSCH (and/or (NR or LTE) PSCCH) (and/or (NR or LTE) SL SSB (and/or UL channel/signal)). Additionally, the proposed method of the present disclosure may be extendedly used by being inter-combined (to a new type of method).

For example, in the present disclosure, a specific threshold value may be pre-defined or may mean a threshold value that is (pre-)configured by a network or base station or a higher layer (including an application layer) of a UE. For example, in the present disclosure, a specific configuration value may be pre-defined or may mean a value that is (pre-)configured by a network or base station or a higher layer (including an application layer) of a UE. For example, an operation that is configured by the network/base station may mean an operation that is (pre-)configured by the base station to the UE via higher layer signaling, or that is configured/signaled by the base station to the UE through a MAC CE, or that is signaled by the base station to the UE through DCI.

Figure 14:
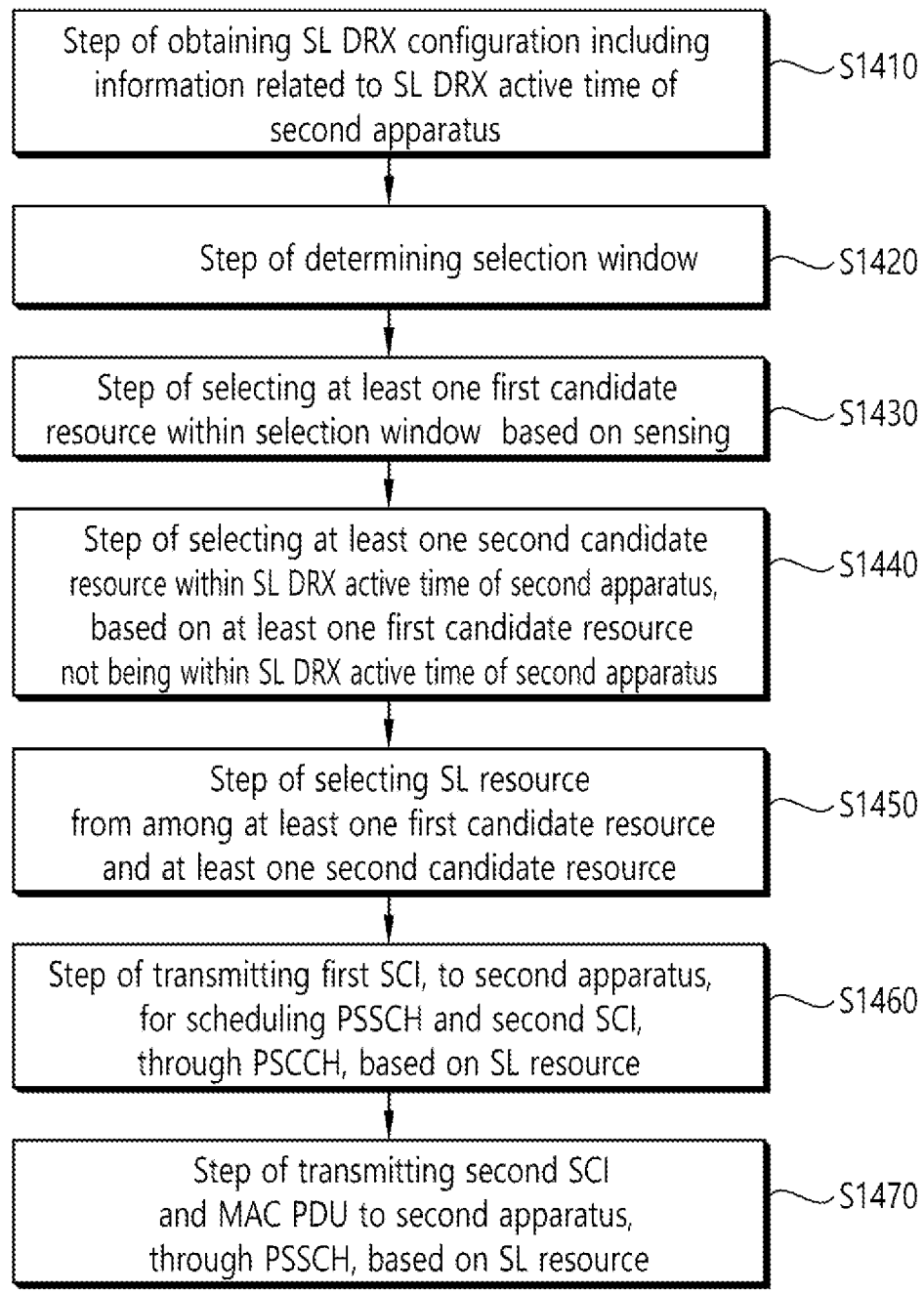
FIG. 14 is a diagram for describing a method for performing wireless communication, by a first apparatus, in accordance with an embodiment of the present disclosure.

FIG. 14 is a diagram for describing a method for performing wireless communication, by a first apparatus, in accordance with an embodiment of the present disclosure. FIG. 14 may be combined with various embodiments of the present disclosure.

Referring to FIG. 14, in step S1410, the first apparatus may obtain sidelink (SL) discontinuous reception (DRX) configuration including information related to SL DRX active time of a second apparatus. In step S1420, for example, the first apparatus may determine a selection window. In step S1430, for example, the first apparatus may select at least one first candidate resource within the selection window based on sensing. In step S1440, for example, the first apparatus may select at least one second candidate resource within the SL DRX active time of the second apparatus, based on the at least one first candidate resource not being within the SL DRX active time of the second apparatus. In step S1450, for example, the first apparatus may select an SL resource from among the at least one first candidate resource and the at least one second candidate resource. In step S1460, for example, the first apparatus may transmit first SCI, to the second apparatus, for scheduling a physical sidelink shared channel (PSSCH) and second sidelink control information (SCI), through a physical sidelink control channel (PSCCH), based on the SL resource. In step S1470, for example, the first apparatus may transmit the second SCI and a medium access control (MAC) packet data unit (PDU) to the second apparatus, through the PSSCH, based on the SL resource.

Additionally or alternatively, the at least one first candidate resource may be a number of resources being selected to be equal to or greater than a first threshold value within the selection window.

Additionally or alternatively, the first threshold value may be a positive integer being equal to or greater than 1.

Additionally or alternatively, the at least one second candidate resource may be a number of resources being additionally selected to be equal to or greater than a second threshold value within the SL DRX active time of the second apparatus.

Additionally or alternatively, the second threshold value may be a positive integer being equal to or greater than 1.

Additionally or alternatively, the second threshold value may be a threshold value related to the SL DRX active time of the second apparatus.

Additionally or alternatively, the at least one second candidate resource may be a number of resources being additionally selected to be equal to or less than a third threshold value within the SL DRX active time of the second apparatus.

Additionally or alternatively, the third threshold value may be a positive integer being equal to or greater than 1.

Additionally or alternatively, the sensing may include partial sensing.

Additionally or alternatively, the partial sensing may include at least one of periodic-based partial sensing (PBPS) or continuous partial sensing (CPS).

Additionally or alternatively, the CPS may include short-term sensing (STS).

Additionally or alternatively, the at least one second candidate resource may not be selected outside of the SL DRX active time of the second apparatus.

Additionally or alternatively, the at least one second candidate resource may be selected based on a first reference signal received power (RSRP) threshold value related to the SL DRX active time of the second apparatus.

Additionally or alternatively, the at least one second candidate resource may be selected based on the first RSRP threshold value and a discrete first step value.

Additionally or alternatively, the at least one second candidate resource may be selected based on an increase in the first reference signal received power (RSRP) threshold value related to the SL DRX active time.

Additionally or alternatively, the at least one second candidate resource may be selected based on the first RSRP threshold value being incremented (or increased) by N number of times, which is equivalent to a pre-configured first step value.

Additionally or alternatively, the value N may be a positive integer.

Additionally or alternatively, the first apparatus may select at least one third candidate resource within a time region during which the SL DRX active time of the second apparatus is extendable, based on the at least one first candidate resource not being within the SL DRX active time of the second apparatus.

Additionally or alternatively, the first apparatus may select at least one fourth candidate resource being excluded from the selection window within the SL DRX active time of the second apparatus, based on the at least one first candidate resource not being within the SL DRX active time of the second apparatus.

Additionally or alternatively, among the at least one second candidate resource, a second candidate resource related to an RSRP being less than or equal to a second reference signal received power (RSRP) threshold value may be selected by a higher priority, based on the at least one first candidate resource not being within the SL DRX active time of the second apparatus.

Additionally or alternatively, among the at least one second candidate resource, a second candidate resource related to an RSRP being less than or equal to a second reference signal received power (RSRP) threshold value may be selected as the SL resource by a higher priority within the SL DRX active time of the second apparatus.

Additionally or alternatively, the first apparatus may extend the selection window, based on the at least one first candidate resource not being within the SL DRX active time of the second apparatus.

The proposed method may be applied to the apparatus according to various embodiments of the present disclosure. Firstly, a processor (102) of the first apparatus (100) may execute the instructions to obtain sidelink (SL) discontinuous reception (DRX) configuration including information related to SL DRX active time of a second apparatus. For example, the processor (102) of the first apparatus (100) may execute the instructions to determine a selection window. For example, the processor (102) of the first apparatus (100) may execute the instructions to select at least one first candidate resource within the selection window based on sensing. For example, the processor (102) of the first apparatus (100) may execute the instructions to select at least one second candidate resource within the SL DRX active time of the second apparatus, based on the at least one first candidate resource not being within the SL DRX active time of the second apparatus. For example, the processor (102) of the first apparatus (100) may execute the instructions to select an SL resource from among the at least one first candidate resource and the at least one second candidate resource. For example, the processor (102) of the first apparatus (100) may execute the instructions to transmit first SCI, to the second apparatus, for scheduling a physical sidelink shared channel (PSSCH) and second sidelink control information (SCI), through a physical sidelink control channel (PSCCH), based on the SL resource. For example, the processor (102) of the first apparatus (100) may execute the instructions to transmit the second SCI and a medium access control (MAC) packet data unit (PDU) to the second apparatus, through the PSSCH, based on the SL resource.

According to an embodiment of the present disclosure, a first apparatus for performing wireless communication may be provided. The first apparatus may include one or more memories storing instructions, one or more transceivers, and one or more processors connected to the one or more memories and the one or more transceivers, wherein the one or more processors may execute the instructions to obtain sidelink (SL) discontinuous reception (DRX) configuration including information related to SL DRX active time of a second apparatus. For example, the one or more processors may execute the instructions to determine a selection window. For example, the one or more processors may execute the instructions to select at least one first candidate resource within the selection window based on sensing. For example, the one or more processors may execute the instructions to select at least one second candidate resource within the SL DRX active time of the second apparatus, based on the at least one first candidate resource not being within the SL DRX active time of the second apparatus. For example, the one or more processors may execute the instructions to select an SL resource from among the at least one first candidate resource and the at least one second candidate resource. For example, the one or more processors may execute the instructions to transmit first SCI, to the second apparatus, for scheduling a physical sidelink shared channel (PSSCH) and second sidelink control information (SCI), through a physical sidelink control channel (PSCCH), based on the SL resource. For example, the one or more processors may execute the instructions to transmit the second SCI and a medium access control (MAC) packet data unit (PDU) to the second apparatus, through the PSSCH, based on the SL resource.

According to an embodiment of the present disclosure, an apparatus configured to control a first user equipment (UE) may be provided. The apparatus may include one or more processors, and one or more memories operably connectable to the one or more processors and storing instructions, wherein the one or more processors may execute the instructions to obtain sidelink (SL) discontinuous reception (DRX) configuration including information related to SL DRX active time of a second UE. For example, the one or more processors may execute the instructions to determine a selection window. For example, the one or more processors may execute the instructions to select at least one first candidate resource within the selection window based on sensing. For example, the one or more processors may execute the instructions to select at least one second candidate resource within the SL DRX active time of the second UE, based on the at least one first candidate resource not being within the SL DRX active time of the second UE. For example, the one or more processors may execute the instructions to select an SL resource from among the at least one first candidate resource and the at least one second candidate resource. For example, the one or more processors may execute the instructions to transmit first SCI, to the second UE, for scheduling a physical sidelink shared channel (PSSCH) and second sidelink control information (SCI), through a physical sidelink control channel (PSCCH), based on the SL resource. For example, the one or more processors may execute the instructions to transmit the second SCI and a medium access control (MAC) packet data unit (PDU) to the second UE, through the PSSCH, based on the SL resource.

According to an embodiment of the present disclosure, a non-transitory computer-readable medium having instructions recorded thereon may be provided. When enacted by one or more processors, the instructions may cause the one or more processors to obtain, by a first apparatus, sidelink (SL) discontinuous reception (DRX) configuration including information related to SL DRX active time of a second apparatus. For example, when enacted by one or more processors, the instructions may cause the one or more processors to determine, by the first apparatus, a selection window. For example, when enacted by one or more processors, the instructions may cause the one or more processors to select, by the first apparatus, at least one first candidate resource within the selection window based on sensing. For example, when enacted by one or more processors, the instructions may cause the one or more processors to select, by the first apparatus, at least one second candidate resource within the SL DRX active time of the second apparatus, based on the at least one first candidate resource not being within the SL DRX active time of the second apparatus. For example, when enacted by one or more processors, the instructions may cause the one or more processors to select, by the first apparatus, an SL resource from among the at least one first candidate resource and the at least one second candidate resource. For example, when enacted by one or more processors, the instructions may cause the one or more processors to transmit, by the first apparatus, first SCI, to the second apparatus, for scheduling a physical sidelink shared channel (PSSCH) and second sidelink control information (SCI), through a physical sidelink control channel (PSCCH), based on the SL resource. For example, when enacted by one or more processors, the instructions may cause the one or more processors to transmit, by the first apparatus, the second SCI and a medium access control (MAC) packet data unit (PDU) to the second apparatus, through the PSSCH, based on the SL resource.

Figure 15:
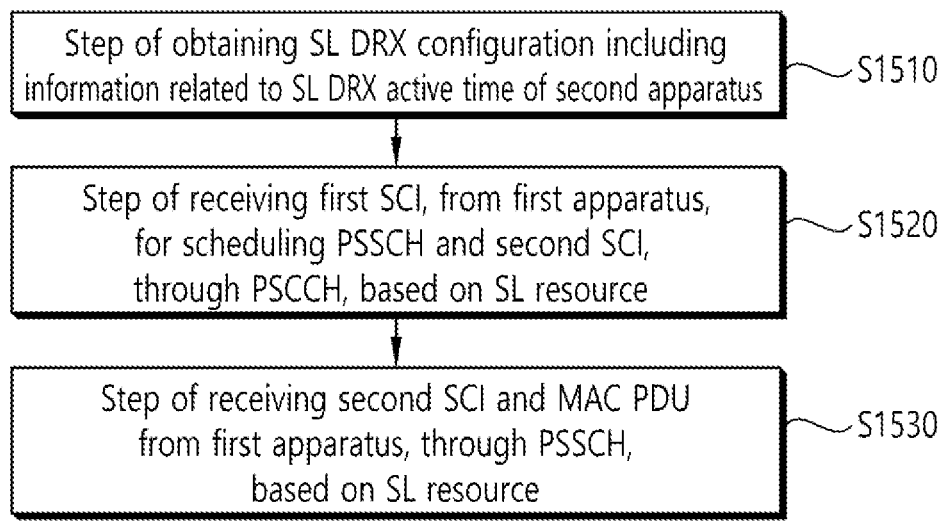
FIG. 15 is a diagram for describing a method for performing wireless communication, by a second apparatus, in accordance with an embodiment of the present disclosure.

FIG. 15 is a diagram for describing a method for performing wireless communication, by a second apparatus, in accordance with an embodiment of the present disclosure. FIG. 15 may be combined with various embodiments of the present disclosure.

Referring to FIG. 15, in step S1510, the second apparatus may obtain sidelink (SL) discontinuous reception (DRX) configuration including information related to SL DRX active time of the second apparatus. In step S1520, the second apparatus may receive first SCI, from a first apparatus, for scheduling a physical sidelink shared channel (PSSCH) and second sidelink control information (SCI), through a physical sidelink control channel (PSCCH), based on the SL resource. In step S1530, the second apparatus may receive the second SCI and a medium access control (MAC) packet data unit (PDU) from the first apparatus, through the PSSCH, based on the SL resource. For example, the SL resource may be a resource that is selected from among at least one second candidate resource being selected within the SL DRX active time of the second apparatus, based on at least one first candidate resource being selected from a selection window and not being within the SL DRX active time of the second apparatus.

Additionally or alternatively, the at least one first candidate resource may be a number of resources being selected to be equal to or greater than a first threshold value within the selection window.

Additionally or alternatively, the first threshold value may be a positive integer being equal to or greater than 1.

Additionally or alternatively, the at least one second candidate resource may be a number of resources being additionally selected to be equal to or greater than a second threshold value within the SL DRX active time of the second apparatus.

Additionally or alternatively, the second threshold value may be a positive integer being equal to or greater than 1.

Additionally or alternatively, the second threshold value may be a threshold value related to the SL DRX active time of the second apparatus.

Additionally or alternatively, the at least one second candidate resource may be a number of resources being additionally selected to be equal to or less than a third threshold value within the SL DRX active time of the second apparatus.

Additionally or alternatively, the third threshold value may be a positive integer being equal to or greater than 1.

Additionally or alternatively, the sensing may include partial sensing.

Additionally or alternatively, the partial sensing may include at least one of periodic-based partial sensing (PBPS) or continuous partial sensing (CPS).

Additionally or alternatively, the CPS may include short-term sensing (STS).

Additionally or alternatively, the at least one second candidate resource may not be selected outside of the SL DRX active time of the second apparatus.

Additionally or alternatively, the at least one second candidate resource may be selected based on a first reference signal received power (RSRP) threshold value related to the SL DRX active time of the second apparatus.

Additionally or alternatively, the at least one second candidate resource may be selected based on the first RSRP threshold value and a discrete first step value.

Additionally or alternatively, the at least one second candidate resource may be selected based on an increase in the first reference signal received power (RSRP) threshold value related to the SL DRX active time.

Additionally or alternatively, the at least one second candidate resource may be selected based on the first RSRP threshold value being incremented (or increased) by N number of times, which is equivalent to a pre-configured first step value.

Additionally or alternatively, the value N may be a positive integer.

Additionally or alternatively, at least one third candidate resource may be selected within a time region during which the SL DRX active time of the second apparatus is extendable, based on the at least one first candidate resource not being within the SL DRX active time of the second apparatus.

Additionally or alternatively, at least one fourth candidate resource being excluded from the selection window may be selected within the SL DRX active time of the second apparatus, based on the at least one first candidate resource not being within the SL DRX active time of the second apparatus.

Additionally or alternatively, among the at least one second candidate resource, a second candidate resource related to an RSRP being less than or equal to a second reference signal received power (RSRP) threshold value may be selected by a higher priority, based on the at least one first candidate resource not being within the SL DRX active time of the second apparatus.

Additionally or alternatively, among the at least one second candidate resource, a second candidate resource related to an RSRP being less than or equal to a second reference signal received power (RSRP) threshold value may be selected as the SL resource by a higher priority within the SL DRX active time of the second apparatus.

Additionally or alternatively, the first apparatus may extend the selection window, based on the at least one first candidate resource not being within the SL DRX active time of the second apparatus.

The proposed method may be applied to the apparatus according to various embodiments of the present disclosure. Firstly, a processor (202) of the second apparatus (200) may execute the instructions to obtain sidelink (SL) discontinuous reception (DRX) configuration including information related to SL DRX active time of the second apparatus. For example, the processor (202) of the second apparatus (200) may execute the instructions to receive first SCI, from a first apparatus, for scheduling a physical sidelink shared channel (PSSCH) and second sidelink control information (SCI), through a physical sidelink control channel (PSCCH), based on the SL resource. For example, the processor (202) of the second apparatus (200) may execute the instructions to receive the second SCI and a medium access control (MAC) packet data unit (PDU) from the first apparatus, through the PSSCH, based on the SL resource. For example, the SL resource may be a resource that is selected from among at least one second candidate resource being selected within the SL DRX active time of the second apparatus, based on at least one first candidate resource being selected from a selection window and not being within the SL DRX active time of the second apparatus.

According to an embodiment of the present disclosure, a second apparatus for performing wireless communication may be provided. The second apparatus may include one or more memories storing instructions, one or more transceivers, and one or more processors connected to the one or more memories and the one or more transceivers, wherein the one or more processors may execute the instructions to obtain sidelink (SL) discontinuous reception (DRX) configuration including information related to SL DRX active time of the second apparatus. For example, the one or more processors may execute the instructions to receive first SCI, from a first apparatus, for scheduling a physical sidelink shared channel (PSSCH) and second sidelink control information (SCI), through a physical sidelink control channel (PSCCH), based on the SL resource. For example, the one or more processors may execute the instructions to receive the second SCI and a medium access control (MAC) packet data unit (PDU) from the first apparatus, through the PSSCH, based on the SL resource. For example, the SL resource may be a resource that is selected from among at least one second candidate resource being selected within the SL DRX active time of the second apparatus, based on at least one first candidate resource being selected from a selection window and not being within the SL DRX active time of the second apparatus.

According to an embodiment of the present disclosure, an apparatus configured to control a second user equipment (UE) may be provided. The apparatus may include one or more processors, and one or more memories operably connectable to the one or more processors and storing instructions, wherein the one or more processors may execute the instructions to obtain sidelink (SL) discontinuous reception (DRX) configuration including information related to SL DRX active time of the second UE. For example, the one or more processors may execute the instructions to receive first SCI, from a first UE, for scheduling a physical sidelink shared channel (PSSCH) and second sidelink control information (SCI), through a physical sidelink control channel (PSCCH), based on the SL resource. For example, the one or more processors may execute the instructions to receive the second SCI and a medium access control (MAC) packet data unit (PDU) from the first UE, through the PSSCH, based on the SL resource. For example, the SL resource may be a resource that is selected from among at least one second candidate resource being selected within the SL DRX active time of the second UE, based on at least one first candidate resource being selected from a selection window and not being within the SL DRX active time of the second UE.

According to an embodiment of the present disclosure, a non-transitory computer-readable medium having instructions recorded thereon may be provided. When enacted by one or more processors, the instructions may cause the one or more processors to obtain, by a second apparatus, sidelink (SL) discontinuous reception (DRX) configuration including information related to SL DRX active time of the second apparatus. For example, when enacted by one or more processors, the instructions may cause the one or more processors to receive, by the second apparatus, first SCI, from a first apparatus, for scheduling a physical sidelink shared channel (PSSCH) and second sidelink control information (SCI), through a physical sidelink control channel (PSCCH), based on the SL resource. For example, when enacted by one or more processors, the instructions may cause the one or more processors to receive, by the second apparatus, the second SCI and a medium access control (MAC) packet data unit (PDU) from the first apparatus, through the PSSCH, based on the SL resource. For example, the SL resource may be a resource that is selected from among at least one second candidate resource being selected within the SL DRX active time of the second apparatus, based on at least one first candidate resource being selected from a selection window and not being within the SL DRX active time of the second apparatus.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
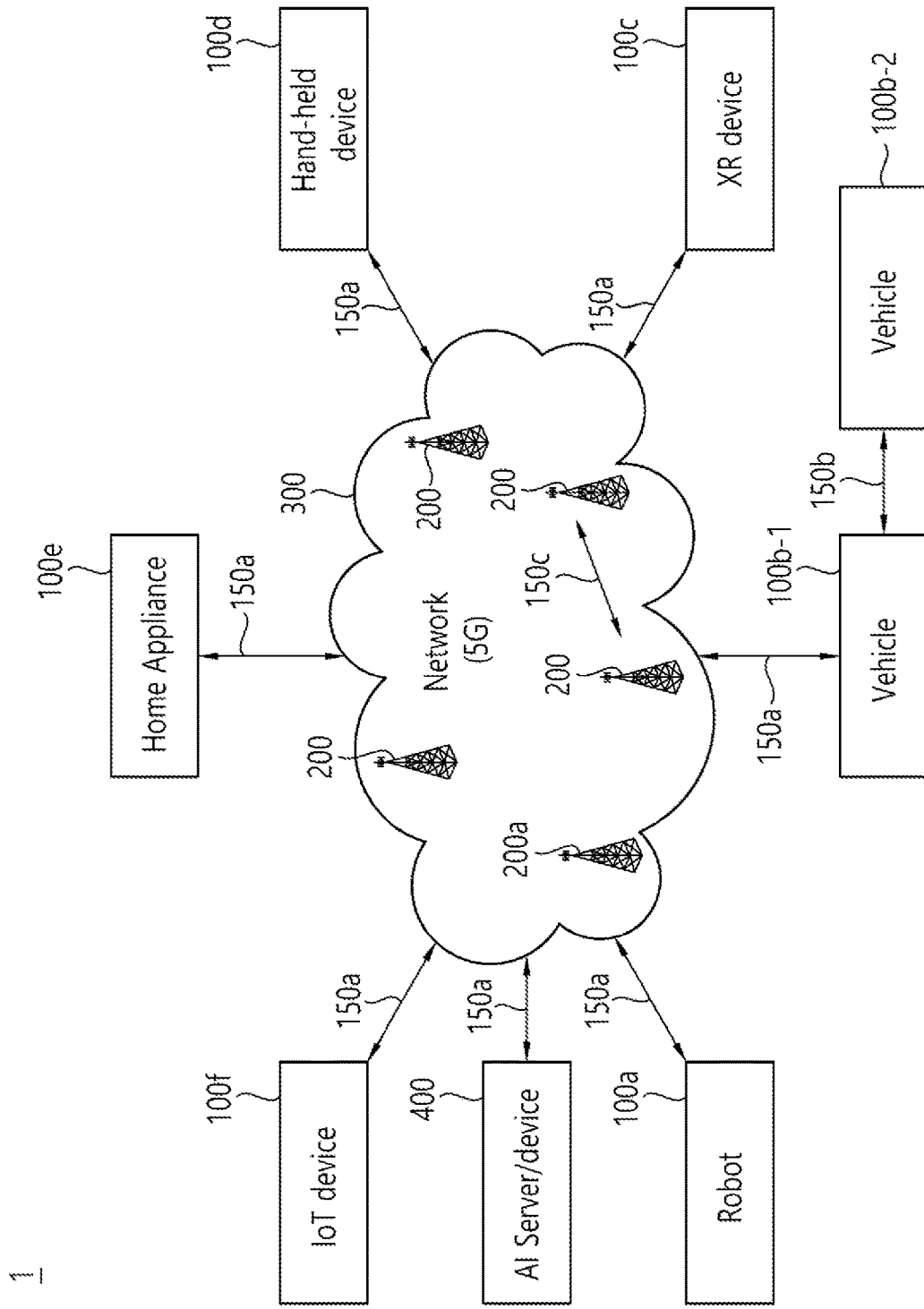
FIG. 16 shows a communication system 1, based on an embodiment of the present disclosure.

FIG. 16 shows a communication system 1, based on an embodiment of the present disclosure. The embodiment of FIG. 16 may be combined with various embodiments of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB 1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f. Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
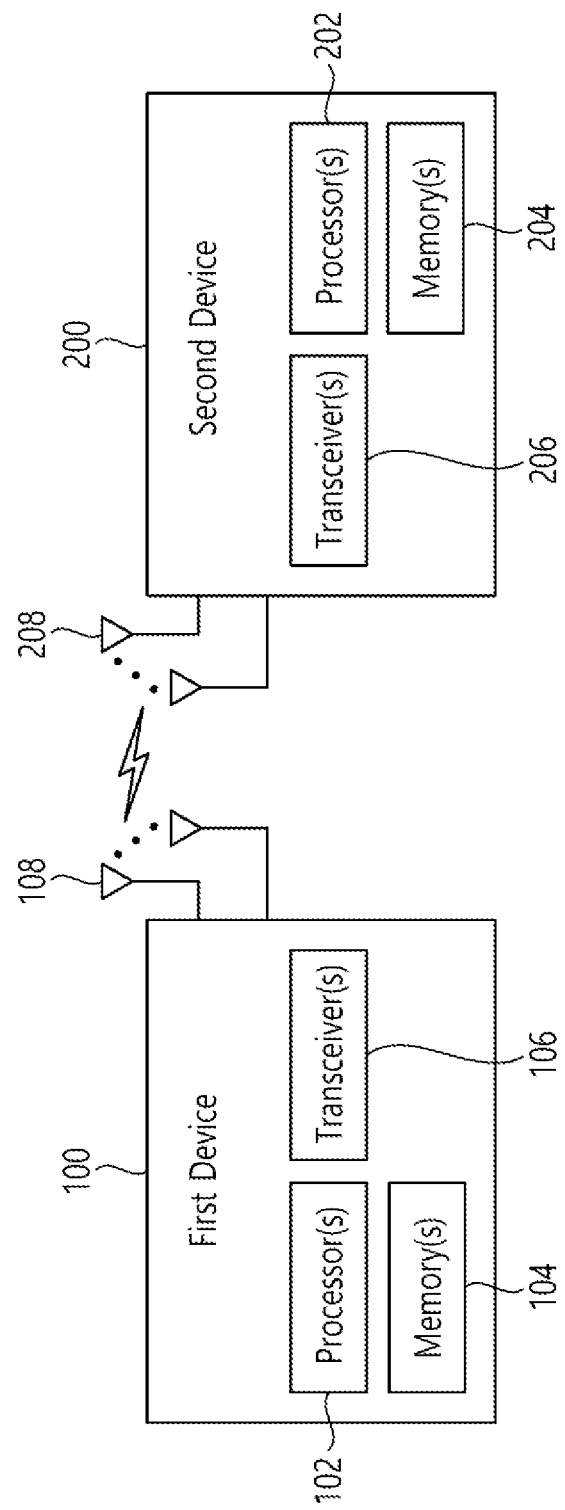
FIG. 17 shows wireless devices, based on an embodiment of the present disclosure.

FIG. 17 shows wireless devices, based on an embodiment of the present disclosure. The embodiment of FIG. 17 may be combined with various embodiments of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
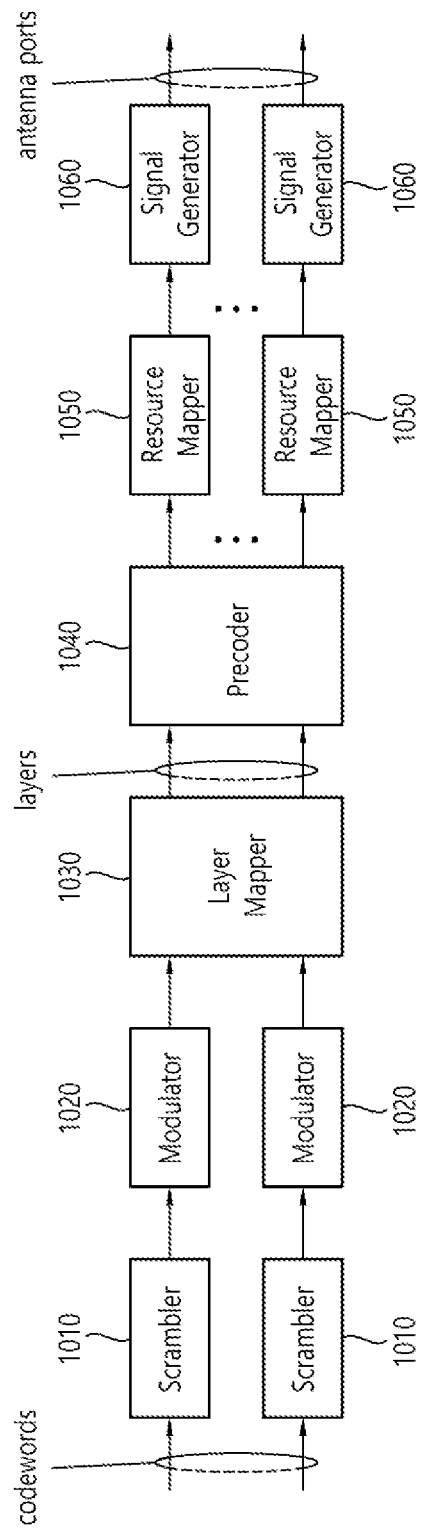
FIG. 18 shows a signal process circuit for a transmission signal, based on an embodiment of the present disclosure.

FIG. 18 shows a signal process circuit for a transmission signal, based on an embodiment of the present disclosure. The embodiment of FIG. 18 may be combined with various embodiments of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
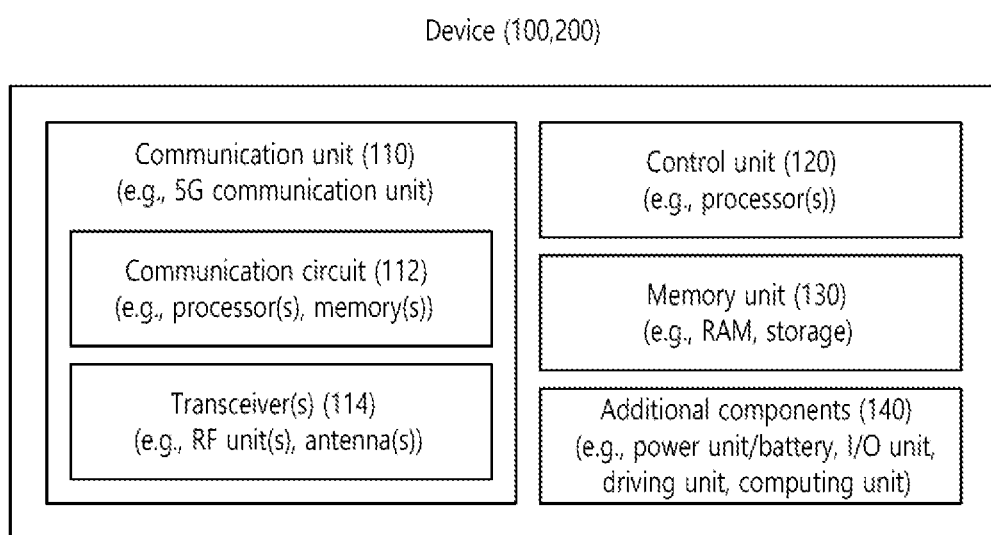
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16). The embodiment of FIG. 19 may be combined with various embodiments of the present disclosure.

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
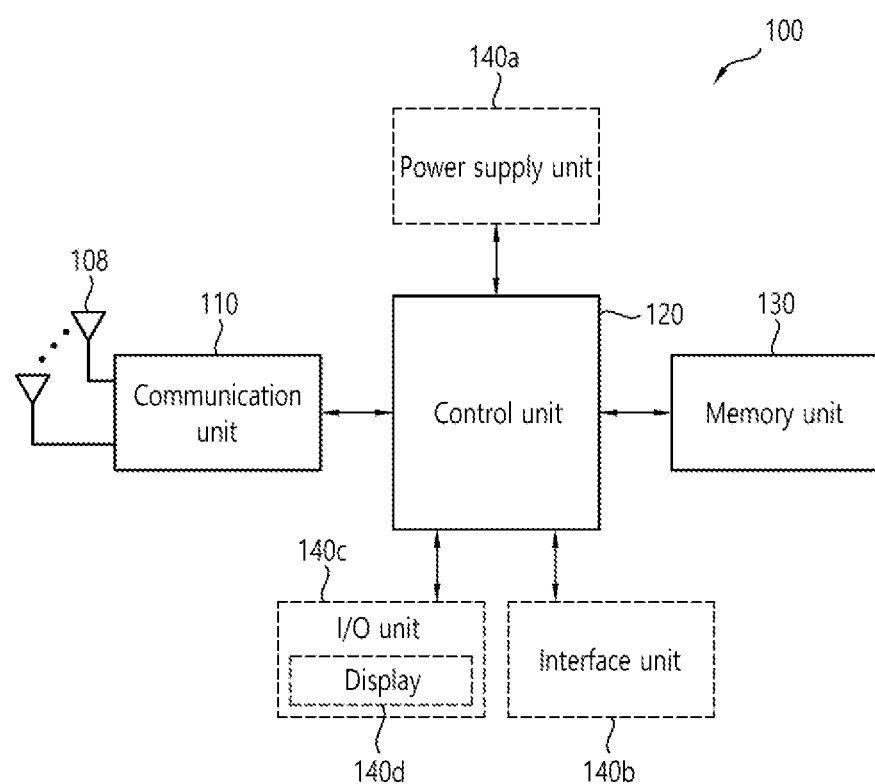
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 20 may be combined with various embodiments of the present disclosure.

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
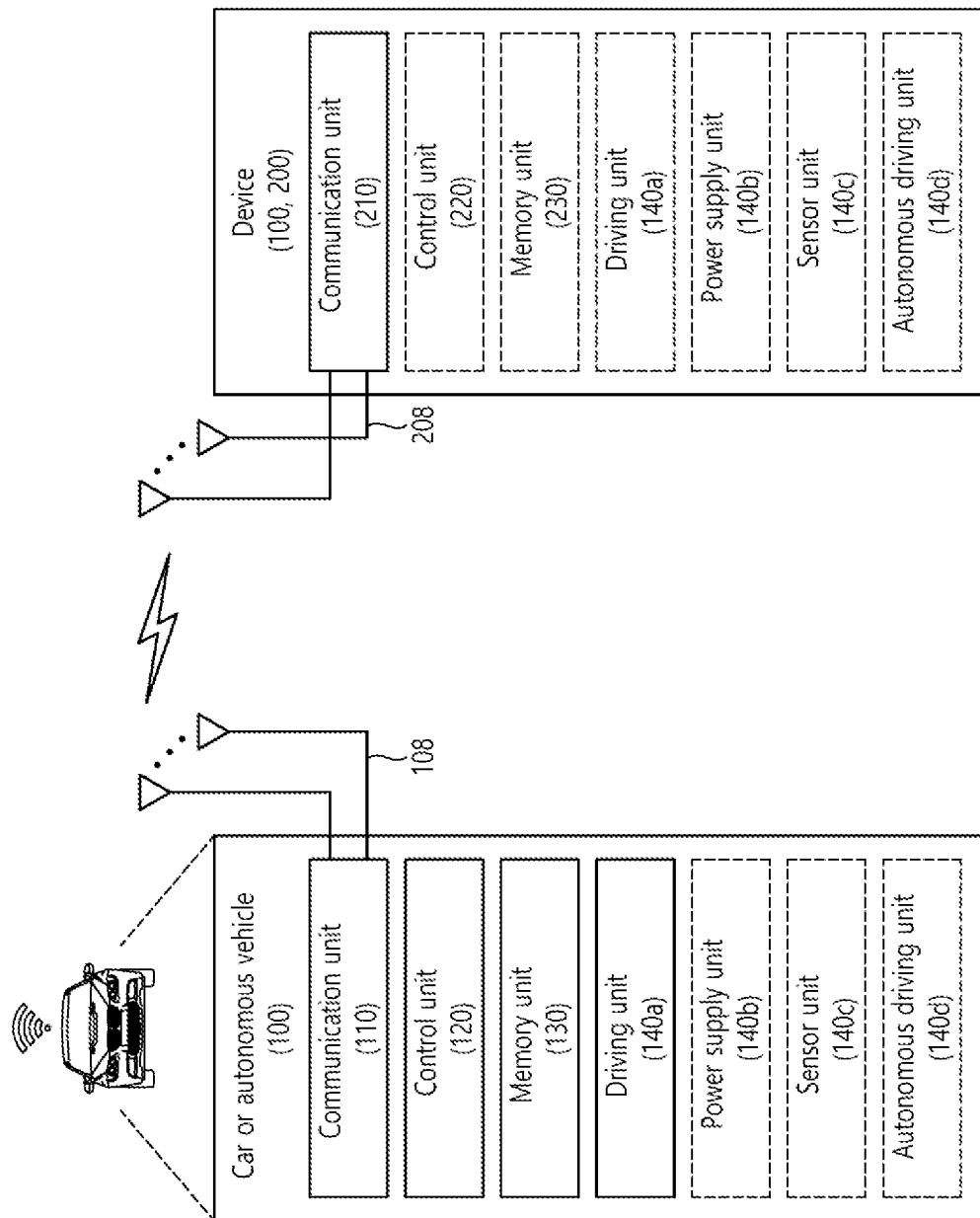
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 21 may be combined with various embodiments of the present disclosure.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, wireless communication, the method comprising:
    selecting a synchronization reference;
    determining a selection window;
    selecting at least one first candidate resource within the selection window based on sensing;
    selecting additionally, at least one second candidate resource within sidelink (SL) discontinuous reception (DRX) active time of a second apparatus, based on (i) the SL DRX active time of the second device being obtained, and (ii) the at least one first candidate resource not being within the SL DRX active time of the second apparatus;
    selecting an SL resource from a subset of resources including the at least one first candidate resource and the at least one second candidate resource; and
    performing SL transmission, based on the SL resource and the synchronization reference.

2. The method of claim 1, wherein the at least one first candidate resource is a number of resources being selected to be equal to or greater than a first threshold value within the selection window, and
    wherein the first threshold value is a positive integer being equal to or greater than 1.

3. The method of claim 1, wherein the at least one second candidate resource is a number of resources being additionally selected to be equal to or greater than a second threshold value within the SL DRX active time of the second apparatus, and
    wherein the second threshold value is a threshold value related to the SL DRX active time of the second apparatus.

4. The method of claim 1, wherein the at least one second candidate resource is a number of resources being additionally selected to be equal to or less than a third threshold value within the SL DRX active time of the second apparatus, and
    wherein the third threshold value is a positive integer being equal to or greater than 1.

5. The method of claim 1, wherein the sensing includes partial sensing,
    wherein the partial sensing includes at least one of periodic-based partial sensing (PBPS) or continuous partial sensing (CPS), and
    wherein the CPS includes short-term sensing (STS).

6. The method of claim 1, wherein the at least one second candidate resource is not selected outside of the SL DRX active time of the second apparatus.

7. The method of claim 6, wherein the at least one second candidate resource is selected based on a first reference signal received power (RSRP) threshold value related to the SL DRX active time of the second apparatus.

8. The method of claim 7, wherein the at least one second candidate resource is selected based on the first RSRP threshold value and a discrete first step value.

9. The method of claim 8, further comprising:
    selecting at least one third candidate resource within a time region during which the SL DRX active time of the second apparatus is extendable, based on the at least one first candidate resource not being within the SL DRX active time of the second apparatus.

10. The method of claim 1, further comprising:
    additionally selecting at least one fourth candidate resource being excluded from the selection window within the SL DRX active time of the second apparatus, based on the at least one first candidate resource not being within the SL DRX active time of the second apparatus.

11. The method of claim 1, wherein, among the at least one second candidate resource, a second candidate resource related to an RSRP being less than or equal to a second reference signal received power (RSRP) threshold value is selected as the SL resource by a higher priority within the SL DRX active time of the second apparatus.

12. The method of claim 1, further comprising:
    extending the selection window, based on the at least one first candidate resource not being within the SL DRX active time of the second apparatus.

13. A first apparatus for performing wireless communication, the first apparatus comprising:
   one or more processors;
   one or more transceivers; and
   one or more memories operably connected to the one or more processors, and storing instructions that, based on being executed, cause the first apparatus to perform operations comprising:
   selecting a synchronization reference;
   determining a selection window;
   selecting at least one first candidate resource within the selection window based on sensing;
   selecting additionally, at least one second candidate resource within sidelink (SL) discontinuous reception (DRX) active time of a second apparatus, based on (i) the SL DRX active time of the second device being obtained, and (ii) the at least one first candidate resource not being within the SL DRX active time of the second apparatus;
   selecting an SL resource from a subset of resources including the at least one first candidate resource and the at least one second candidate resource; and
   performing SL transmission, based on the SL resource and the synchronization reference.

14. An apparatus adapted to control a first user equipment (UE), the apparatus comprising:
   one or more processors; and
   one or more memories operably connectable to the one or more processors and storing instructions that, based on being executed by the one or more processors, cause the first UE to perform operations comprising:
   selecting a synchronization reference;
   determining a selection window;
   selecting at least one first candidate resource within the selection window based on sensing;
   selecting additionally, at least one second candidate resource within sidelink (SL) discontinuous reception (DRX) active time of a second UE, based on (i) the SL DRX active time of the second UE being obtained, and (ii) the at least one first candidate resource not being within the SL DRX active time of the second UE;
   selecting an SL resource from a subset of resources including the at least one first candidate resource and the at least one second candidate resource; and
   performing SL transmission, based on the SL resource and the synchronization reference.

\* \* \* \* \*